US012591068B1

(12) United States Patent
Srivastava et al.

(10) Patent No.: US 12,591,068 B1
(45) Date of Patent: Mar. 31, 2026

(54) LEO SATELLITE CONNECTION ASSISTANCE USING MEO SATELLITE SIGNAL DATA

(71) Applicant: Apple Inc., Cupertino, CA (US)

(72) Inventors: Aditya N. Srivastava, Fremont, CA (US); Glenn D. MacGougan, San Jose, CA (US); Harsha Shirahatti, Santa Clara, CA (US); William J. Bencze, Half Moon Bay, CA (US); Aleksey Shlyapnikov, San Jose, CA (US); Abhishek Walia, Cupertino, CA (US); Lohit Sarna, San Mateo, CA (US); Venkateswara Rao Manepalli, San Jose, CA (US); Sudhir K. Baghel, Hillsborough, NJ (US); Thanigaivelu Elangovan, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 705 days.

(21) Appl. No.: 17/668,233

(22) Filed: Feb. 9, 2022

Related U.S. Application Data

(63) Continuation of application No. 17/192,626, filed on Mar. 4, 2021, now abandoned.

(51) Int. Cl.
 *G01S 19/08* (2010.01)
(52) U.S. Cl.
 CPC .................................. *G01S 19/08* (2013.01)
(58) Field of Classification Search
 CPC ... G01S 19/08; H04B 7/1851; H04B 7/18589; H04B 7/18504
 See application file for complete search history.

(56) References Cited

U.S. PATENT DOCUMENTS 6,157,896 A * 12/2000 Castles .............. H04B 7/18552
342/357.68
6,272,316 B1 * 8/2001 Wiedeman ......... H04B 7/18539
455/12.1
(Continued)

FOREIGN PATENT DOCUMENTS

CN 107655474 A * 2/2018 ............. G01S 19/49
CN 111976584 A * 11/2020 ............. B60Q 1/085
(Continued)

OTHER PUBLICATIONS

17668233_2024-10-09_CN_107655474_A_H.pdf, machine translation of CN-107655474-A (Year: 2018).*
(Continued)

*Primary Examiner* — William Kelleher
*Assistant Examiner* — Kenneth W Good
(74) *Attorney, Agent, or Firm* — FLETCHER YODER PC

(57) ABSTRACT

Embodiments herein leverage medium Earth orbit (MEO) satellite signals to increase a likelihood of establishing communication with a low Earth orbit (LEO) satellite. The disclosed embodiments may receive MEO satellite signal data and, in response to determining that the MEO satellite signal data indicates a signal quality below a threshold value, provide an indication to move a user device to get a better signal quality. The disclosed embodiments may also receive a LEO satellite position, and indicate the LEO satellite position to lead a user to move the user device for a better chance to establish communication with the LEO satellite. The disclosed embodiments may determine a time of day based on the MEO satellite signal data, receive light sensor data, and provide an indication to move the user device to an open sky condition to increase the likelihood of establishing communication with the LEO satellite.

20 Claims, 12 Drawing Sheets

(56)        References Cited

U.S. PATENT DOCUMENTS

| | | | |
|---|---|---|---|
| 9,121,932 B2 | 9/2015 | Janky et al. | |
| 11,075,689 B1 * | 7/2021 | Hassan | H04B 7/18513 |
| 2009/0135060 A1 * | 5/2009 | Lennen | G01S 19/35 |
| | | | 342/357.76 |
| 2014/0070991 A1 * | 3/2014 | Liu | G01S 19/428 |
| | | | 342/357.63 |
| 2014/0163870 A1 * | 6/2014 | Riley | G01S 19/49 |
| | | | 701/470 |
| 2017/0227647 A1 * | 8/2017 | Baik | G01S 7/4802 |
| 2019/0319724 A1 * | 10/2019 | Cordone | H04B 17/318 |
| 2020/0382206 A1 * | 12/2020 | Adams | H04B 7/18536 |
| 2021/0243293 A1 * | 8/2021 | Ökvist | H04B 7/0413 |
| 2021/0258834 A1 * | 8/2021 | Pastuszak | H04W 36/0016 |
| 2023/0170986 A1 * | 6/2023 | Chen | H04B 17/382 |
| | | | 455/12.1 |
| 2023/0216581 A1 * | 7/2023 | Stanwood | H04B 7/18578 |
| | | | 398/125 |

FOREIGN PATENT DOCUMENTS

| | | | | | |
|---|---|---|---|---|---|
| EP | 3355079 | A1 | 8/2018 | | |
| KR | 20060076643 | A | * 7/2006 | | H05B 37/02 |
| WO | 2020226862 | A2 | 11/2020 | | |

OTHER PUBLICATIONS

17668233_2024-10-10_KR_20060076643_A_H.pdf, machine translation of KR-20060076643-A (Year: 2006).*
17668233_2025-06-17_CN_111976584_A_M.pdf, machine translation of CN-111976584-A (Year: 2020).*

* cited by examiner

1

LEO SATELLITE CONNECTION ASSISTANCE USING MEO SATELLITE SIGNAL DATA

CROSS-REFERENCE TO RELATED APPLICATION

This application claims priority to and benefit of U.S. patent application Ser. No. 17/192,626, filed Mar. 4, 2021, and entitled "LEO SATELLITE CONNECTION ASSIS-TANCE USING MEO SATELLITE SIGNAL DATA," which is incorporated herein by reference in its entirety for all purposes.

BACKGROUND

The present disclosure relates generally to satellite com-munication, and more specifically to establishing commu-nication with a low Earth orbit (LEO) satellite from a terrestrial user device.

A user device located on the Earth's surface may attempt to establish a connection with a LEO satellite to transmit and receive data. For the connection to be established, the user device may need to have a clear line of sight to the LEO satellite. However, natural impediments (e.g., trees or cliffs), manmade impediments (e.g., buildings, bridges, ceilings, or roofs) may block the clear line of sight between the user device and the LEO satellite. Moreover, due to the relatively fast orbital speed of the LEO satellite, a window for user device to establish the connection with the LEO satellite may be limited.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, an electronic device includes a medium Earth orbit (MEO) satellite communication inter-face and one or more processors that receive signal data of one or more MEO satellites via the MEO satellite interface and provide an indication of a predicted signal quality of a low Earth orbit (LEO) satellite based on the signal data of the one or more MEO satellites.

In another embodiment, a method includes determining, via an electronic device, that a connection to a LEO satellite cannot be established. The method also includes receiving, via the electronic device, signal data of one or more global navigation satellites. The method further includes providing, via the electronic device, an indication to move to increase a likelihood of establishing the connection to the LEO satellite based on the signal data of the one or more global navigation satellites.

In yet another embodiment, one or more tangible, non-transitory, computer-readable media stores computer-read-able instructions that, when executed by one or more pro-cessors, cause the one or more processors to receive signal data of one or more MEO satellites, and provide an indica-tion of a predicted signal quality of a LEO satellite based on the signal data of the one or more MEO satellites.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclo-sure without limitation to the claimed subject matter.

BRIEF DESCRIPTION OF THE DRAWINGS

Various aspects of this disclosure may be better under-stood upon reading the following detailed description and upon reference to the drawings described below in which like numerals refer to like parts.

DETAILED DESCRIPTION OF SPECIFIC EMBODIMENTS

Figure 1:
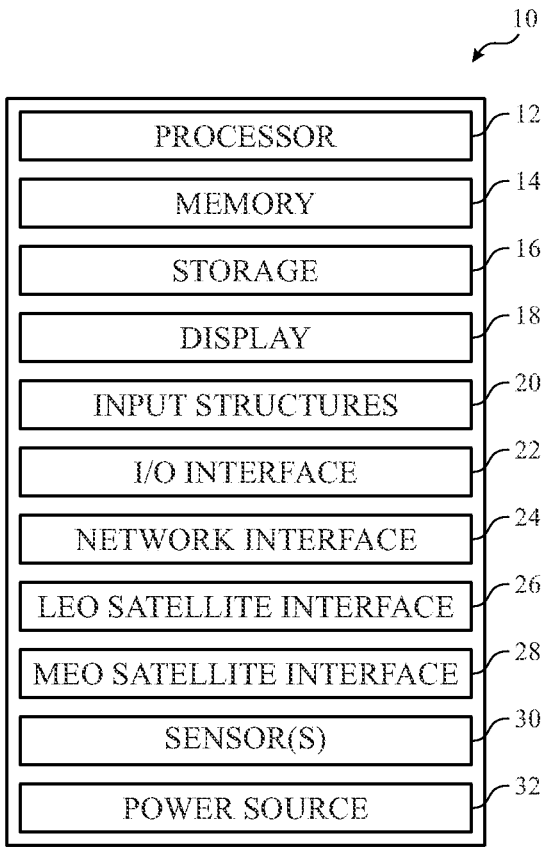
FIG. 1 is a block diagram of an electronic device, accord-ing to embodiments of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the particular features, structures, or characteristics may be combined in any suitable manner in one or more embodiments. Use of the term "approximately," "near," "about", and/or "substantially" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on).

This disclosure is directed to improving conditions for a terrestrial user device (e.g., a user device located on the Earth's surface) to establish communication with a low Earth orbit (LEO) satellite by leveraging the user device's connection to a medium Earth orbit (MEO) satellite. In particular, the user device may include a LEO satellite communication interface (e.g., a LEO satellite modem) that is activated or placed in an operation state. However, the LEO satellite interface may not connect to a LEO satellite because there is not a clear line of sight between the user device and the LEO satellite. This may be due to natural impediments (e.g., trees or cliffs), manmade impediments (e.g., buildings or bridges), being indoors, and so on, and/or due to a LEO satellite not physically being within the line of sight of the user device.

Embodiments herein provide various apparatuses and techniques that leverage a MEO satellite communication interface (e.g., a MEO satellite modem) of a terrestrial user device, and, more particularly, MEO satellite signals received using the MEO satellite interface to increase a likelihood of the user device establishing communication with a LEO satellite. Due to its greater distance from Earth, a MEO satellite is visible from a point on the Earth for a greater time (e.g., for a few hours) than a LEO satellite (e.g., for about 10-20 minutes). Moreover, satellite systems such as global navigation satellite systems (GNSS's), including the United States NAVSTAR Global Positioning System (GPS), Russia's Global Navigation Satellite System (GLO-NASS), the European Union's Galileo, China's BeiDou Navigation Satellite System (BDS), and other regional systems, use a network of MEO satellites that provide global or near-global coverage, which ensure that the user device may have a high likelihood of connecting to a GNSS MEO satellite. If a user device can communicate with such a MEO satellite, then it has a clear line of sight to the MEO satellite. In this case, if the user device is within range of a LEO satellite, then the user device may also have a clear line of sight to the LEO satellite, and thus may establish communication with the LEO satellite.

Thus, in some embodiments, the disclosed apparatuses and techniques may receive MEO satellite signal data and, in response to determining that the MEO satellite signal data indicates a signal quality below a threshold value, provide an indication to move a user device (e.g., to get a better signal quality). In the case where the MEO satellite signal data indicates a signal quality above or equal to threshold value, the disclosed apparatuses and techniques may provide an indication that the signal quality is good or sufficient. In some embodiments, there may be multiple threshold values, and the disclosed apparatuses and techniques may indicate gradations of the signal quality (e.g., low, medium, high, and so on).

In additional or alternative embodiments, the disclosed apparatuses and techniques may receive a LEO satellite position, and indicate the LEO satellite position to lead a user to move the user device for a better chance to establish communication with the LEO satellite. For example, the disclosed apparatuses and techniques may display a map, MEO satellite positions and the LEO satellite position on the map. Indications of the signal qualities of the MEO satellites may also be displayed. This may facilitate leading a user to move the user device so that a signal quality of a MEO satellite position near the LEO satellite position is good, thus increasing the likelihood that communication may be established with the LEO satellite.

In one embodiment, the disclosed apparatuses and techniques may determine a time of day based on the MEO satellite signal data, and receive light sensor data from a light sensor of the user device (e.g., a camera). If the time of day corresponds to daytime, but the light sensor data is not indicative of an open sky condition, then the disclosed apparatuses and techniques may provide an indication to move the user device to the open sky condition to increase the likelihood of establishing communication with the LEO satellite.

FIG. 1 is a block diagram of an electronic device 10, according to embodiments of the present disclosure. The electronic device 10 may include, among other things, one or more processors 12 (collectively referred to herein as a single processor for convenience, which may be implemented in any suitable form of processing circuitry), memory 14, nonvolatile storage 16, a display 18, input structures 20, an input/output (I/O) interface 22, a network interface 24, a lower Earth orbit (LEO) satellite interface 26, a medium Earth orbit (MEO) satellite interface 28, one or more sensors 30, and a power source 32. The various functional blocks shown in FIG. 1 may include hardware elements (including circuitry), software elements (including computer code stored on a computer-readable medium) or a combination of both hardware and software elements. The processor 12, memory 14, the nonvolatile storage 16, the display 18, the input structures 20, the input/output (I/O) interface 22, the network interface 24, the LEO satellite interface 26, the MEO satellite interface 28, the one or more sensors 30, and/or the power source 32 may each be communicatively coupled directly or indirectly (e.g., through or via another component, a communication bus, a network) to one another to transmit and/or receive data between one another. It should be noted that FIG. 1 is merely one example of a particular implementation and is intended to illustrate the types of components that may be present in electronic device 10.

By way of example, the electronic device 10 may represent a block diagram of any suitable computing device, including a desktop computer, a notebook computer, a portable electronic or handheld electronic device (e.g., a wireless electronic device or smartphone), a tablet, a wearable electronic device, and other similar devices. It should be noted that the processor 12 and other related items in FIG. 1 may be a single contained processing module or may be incorporated wholly or partially within any of the other elements within the electronic device 10. The processor 12 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. The processors 12 may perform the various functions described herein and below.

In the electronic device 10 of FIG. 1, the processor 12 may be operably coupled with the memory 14 and the nonvolatile storage 16 to perform various algorithms. That is, the processor 12 may execute programs or instructions (including an operating system) stored in any suitable article of manufacture that includes one or more tangible, computer-readable media, including the memory 14 and/or the nonvolatile storage 16, to provide various functionalities. The memory 14 and the nonvolatile storage 16 may include any suitable articles of manufacture for storing data and executable instructions, such as random-access memory, read-only memory, rewritable flash memory, hard drives, and optical discs.

The display 18 may display images for viewing by users. The display 18 may include a touch screen, which may facilitate user interaction with a user interface of the electronic device 10. In some embodiments, the display 18 may include one or more liquid crystal displays (LCDs), light-emitting diode (LED) displays, organic light-emitting diode (OLED) displays, active-matrix organic light-emitting diode (AMOLED) displays, and/or any other suitable other display technologies.

The input structures 20 of the electronic device 10 may enable a user to interact with the electronic device 10 (e.g., pressing a button to increase or decrease a volume level). The I/O interface 22 may enable the electronic device 10 to interface with various other electronic devices, as may the network interface 24. The network interface 24 may include, for example, one or more interfaces that enable connection to and/or communication via a personal area network (PAN), such as a BLUETOOTH® network, a local area network (LAN) or wireless local area network (WLAN), such as a network employing one of the IEEE 802.11x family of protocols (e.g., WI-FI®), a wide area network (WAN), such as any standards related to the Third Generation Partnership Project (3GPP), including, for example, a $3^{rd}$ generation (3G) cellular network, universal mobile telecommunication system (UMTS), $4^{th}$ generation (4G) cellular network, long term evolution (LTE®) cellular network, long term evolution license assisted access (LTE-LAA) cellular network, $5^{th}$ generation (5G) cellular network, and/or New Radio (NR) cellular network, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth.

The LEO satellite interface 26 may enable connection to and/or communication with a LEO satellite and/or LEO satellite network. For example, the LEO satellite interface 26 may include a satellite modem. Similarly, the MEO satellite interface 28 may enable connection to and/or communication with a MEO satellite and/or MEO satellite network. For example, the MEO satellite interface 28 may include a satellite modem. In some cases, the MEO satellite network may include a global navigation satellite system (GNSS), such as the United States NAVSTAR Global Positioning System (GPS), Russia's Global Navigation Satellite System (GLONASS), the European Union's Galileo, China's BeiDou Navigation Satellite System (BDS), and other regional systems.

The sensors 30 may include any suitable sensor that detects changes or measures physical properties in the environment surrounding the electronic device 10. For example, the sensors 30 may include a light sensor, such as one or more cameras, that may detect or measure an amount of ambient light near the electronic device 10. As another example, the sensors 30 may include a motion sensor, such as one or more gyroscopes or accelerometers, that detects changes in the motion of the electronic device 10 and/or determines an orientation of the electronic device 10 (e.g., tilt, how the user is holding the electronic device 10). The power source 32 of the electronic device 10 may include any suitable source of power, such as a rechargeable lithium polymer (Li-poly) battery and/or an alternating current (AC) power converter.

Figure 2:
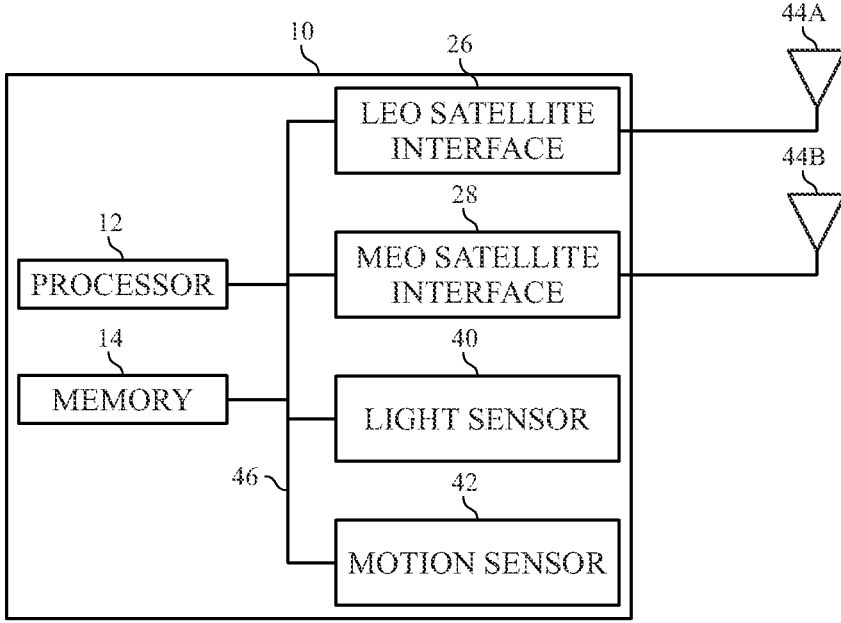
FIG. 2 is a block diagram of the electronic device of FIG. 1 that may implement the components shown in FIG. 1 and/or the following figures, according to embodiments of the present disclosure.

FIG. 2 is a block diagram of the electronic device 10 that may implement the components shown in FIG. 1 and/or the following figures, according to embodiments of the present disclosure. As illustrated, the processor 12, the memory 14, the LEO satellite interface 26, the MEO satellite interface 28, a light sensor 40, a motion sensor 42, and/or the antennas 44 (illustrated as 44A and 44B) may be communicatively coupled directly or indirectly (e.g., through or via another component, a communication bus, a network) to one another to transmit and/or receive data between one another.

The electronic device 10 may include the LEO satellite interface 26 that enables transmission and reception of data between the electronic device 10 and a LEO satellite via one or more antennas 44A. The electronic device 10 may also include the MEO satellite interface 28 that enables transmission and reception of data between the electronic device 10 and a MEO satellite via one or more antennas 44B. The antennas 44 may be configured in an omnidirectional or directional configuration, in a single-beam, dual-beam, or multi-beam arrangement, and so on. Each antenna 44 may be associated with a one or more beams and various configurations. In some embodiments, the LEO satellite interface 26 and the MEO satellite interface 28 may share antennas 44.

In some embodiments, the electronic device 10 may include a light sensor 40, such as a camera, that detects or measures an amount of ambient light near the electronic device 10. Additionally or alternatively, the electronic device 10 may include a motion sensor 42, such as one or more gyroscopes or accelerometers, that detects changes in the motion of the electronic device 10 and/or determines an orientation of the electronic device 10.

As illustrated, the various components of the electronic device 10 may be coupled together by a bus system 46. The bus system 46 may include a data bus, for example, as well as a power bus, a control signal bus, and a status signal bus, in addition to the data bus. In additional or alternative embodiments, the components of the electronic device 10 may be coupled together and transfer data to and from each other using any other suitable mechanism or technique.

Figure 3:
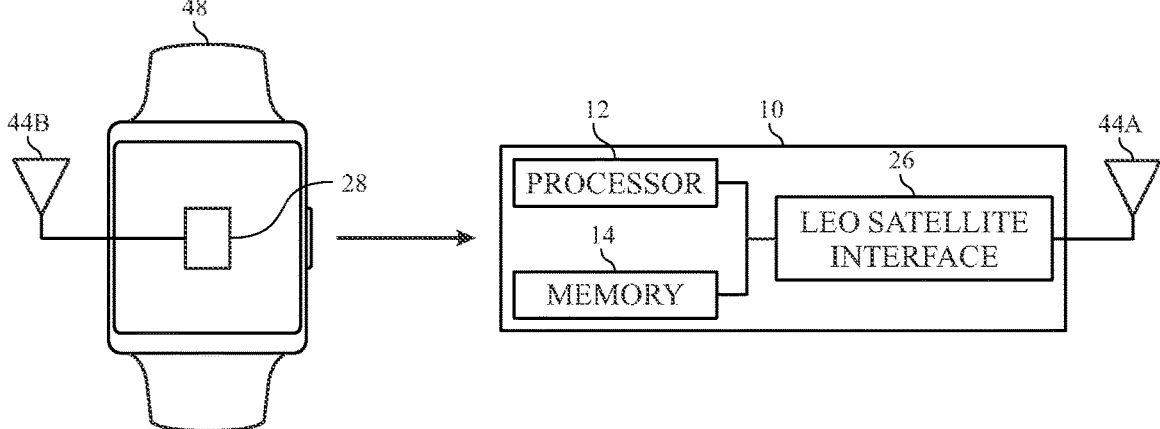
FIG. 3 illustrates another electronic device communica-tively coupled to the electronic device of FIG. 1 and providing a medium Earth orbit (MEO) satellite interface, according to embodiments of the present disclosure.

In some embodiments, an additional electronic device, such as a desktop computer, a notebook computer, a portable electronic or handheld electronic device (e.g., a wireless electronic device or smartphone), a tablet, a wearable electronic device, or another similar device, may provide one of the components shown in the electronic device 10 of FIG. 1 or FIG. 2. FIG. 3 illustrates another electronic device 48 (e.g., a wearable electronic device) communicatively coupled to the electronic device 10 of FIG. 1 and providing the MEO satellite interface 28, according to embodiments of the present disclosure. Thus, the other electronic device 48 may receive GNSS signal data from GNSS MEO satellites via the MEO satellite interface 28 and the antenna 44B. The other electronic device 48 may then send the GNSS signal data to the electronic device 10. While FIG. 3 illustrates the other electronic device 48 having the MEO satellite interface 28, it should be understood that the other electronic device 48 may have additional or alternative components of the electronic device 10 of FIG. 1 or FIG. 2, such as the LEO satellite interface 26 (and the antenna 44A). Moreover, while FIG. 3 illustrates the other electronic device 48 as a wearable device, it should be understood that the other electronic device 48 may be any suitable electronic device that may communicatively couple and/or transfer data with the electronic device 10.

Figure 4:
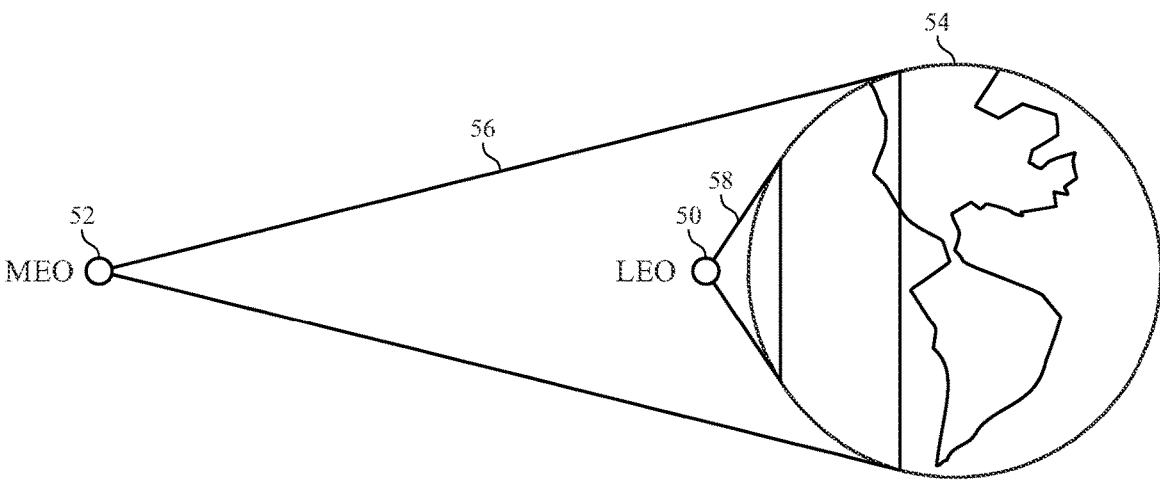
FIG. 4 is a schematic diagram illustrating distances of a low Earth orbit (LEO) satellite and a MEO satellite from Earth.

As mentioned above, embodiments herein provide various apparatuses and techniques that leverage the MEO satellite interface 28, and, more particularly, MEO satellite signals received via the MEO satellite interface 28 to increase a likelihood of the electronic device 10 establishing communication with a LEO satellite. FIG. 4 is a schematic diagram illustrating distances of a LEO satellite 50 and a MEO satellite 52 from Earth 54. The LEO satellite 50 may orbit at an altitude of 2000 kilometers (km) or less above sea level, or with at least 11.25 periods per day (an orbital period of 128 minutes or less) and an eccentricity less than 0.25. A common altitude for the LEO satellite 50 is between 160 to 1000 km above sea level. The LEO satellite 50 may have a mean orbital velocity of about 7.8 km/second (28,000 km/hour) to maintain a stable low Earth orbit, but this orbital velocity reduces with increased orbital altitude. In contrast, the MEO satellite 52 may orbit at an altitude of greater than that of the LEO satellite 50 (2000 km) and less than that of a geosynchronous orbit (35,786 km above sea level). The most common altitude for the MEO satellite 52 is approximately 20,200 km, which yields an orbital period of 12 hours, as used, for example, by GPS. The orbital periods of MEO satellites 52 range from about 2 to nearly 24 hours.

The MEO satellite 52 may have a mean orbital velocity of about 14,000 km/hour (half that of the LEO satellite 50) to maintain a stable Earth orbit, but this orbital velocity reduces with increased orbital altitude.

Due to its greater distance from Earth and slower orbital speed, the MEO satellite 52 may have greater coverage 56 of the Earth's surface than the LEO satellite 50 (e.g., 58). That is, the MEO satellite 52 is visible from a point on the Earth 54 for a greater time (e.g., for a few hours) than the LEO satellite 50 (e.g., for about 10-20 minutes). Moreover, satellite systems such as global navigation satellite systems (GNSS's), including GPS, GLONASS, Galileo, BDS, and other regional systems, use a network of MEO satellites 52 that provide global or near-global coverage, which ensure that the electronic device 10 may have a high likelihood of connecting to a GNSS MEO satellite 52. If the electronic device 10 can communicate with such a MEO satellite 52, then it has a clear line of sight to the MEO satellite 52. In this case, if the electronic device 10 is within range of a LEO satellite 50, then the electronic device 10 may also have a clear line of sight to the LEO satellite 50, and thus may establish communication with the LEO satellite 50.

Thus, in some embodiments, the processor 12 of the electronic device 10 may receive MEO satellite signal data and, in response to determining that the MEO satellite signal data indicates a signal quality below a threshold value, provide an indication to move the electronic device 10 (e.g., to get a better signal quality). In the case where the MEO satellite signal data indicates a signal quality above or equal to threshold value, the processor 12 may provide an indication that the signal quality is good or sufficient. Additionally or alternatively, the processor 12 may determine a time of day based on the MEO satellite signal data, and receive light sensor data from the light sensor 40. If the time of day corresponds to daytime, but the light sensor data is not indicative of an open sky condition, then the processor 12 may provide an indication to move the electronic device 10 to the open sky condition to increase the likelihood of establishing communication with the LEO satellite 50.

The indication to move the electronic device 10 may be of any suitable format to urge a user to move the electronic device 10. For example, the indication may be in the form of a series of bars that indicate low signal quality (e.g., where no bars are full or only one bar is full), medium signal quality (e.g., some or half the bars are full), and high signal quality (e.g., all bars are full). In some embodiments, the indication may be in the form of one or more arrows that urge the user to tilt, angle, or move the electronic device 10. As another example, the indication may be a colored graphic (e.g., a circle) that is one color (e.g., red) when the signal quality is low, another color (e.g., yellow) or a combination of colors (e.g., part red and part green) when the signal quality is medium, and yet another color when the signal quality is high (e.g., green). As yet another example, the indication may incorporate flashing light, where a display graphic is dark when the signal quality is low, flashing when the signal quality is medium, and solidly lit when the signal quality is high. Moreover, it is contemplated that any of the examples of indications described herein may be combined.

In some embodiments, the electronic device 10 may generate a map, and display MEO satellite positions and the LEO satellite position on the map (via the display 18). The electronic device 10 may also display indications of the signal qualities of the MEO satellites 52 on the map. This may facilitate leading a user to move the electronic device 10 so that a signal quality of a MEO satellite position near the LEO satellite position is good, thus increasing the likelihood that communication may be established with the LEO satellite 50.

Figure 5:
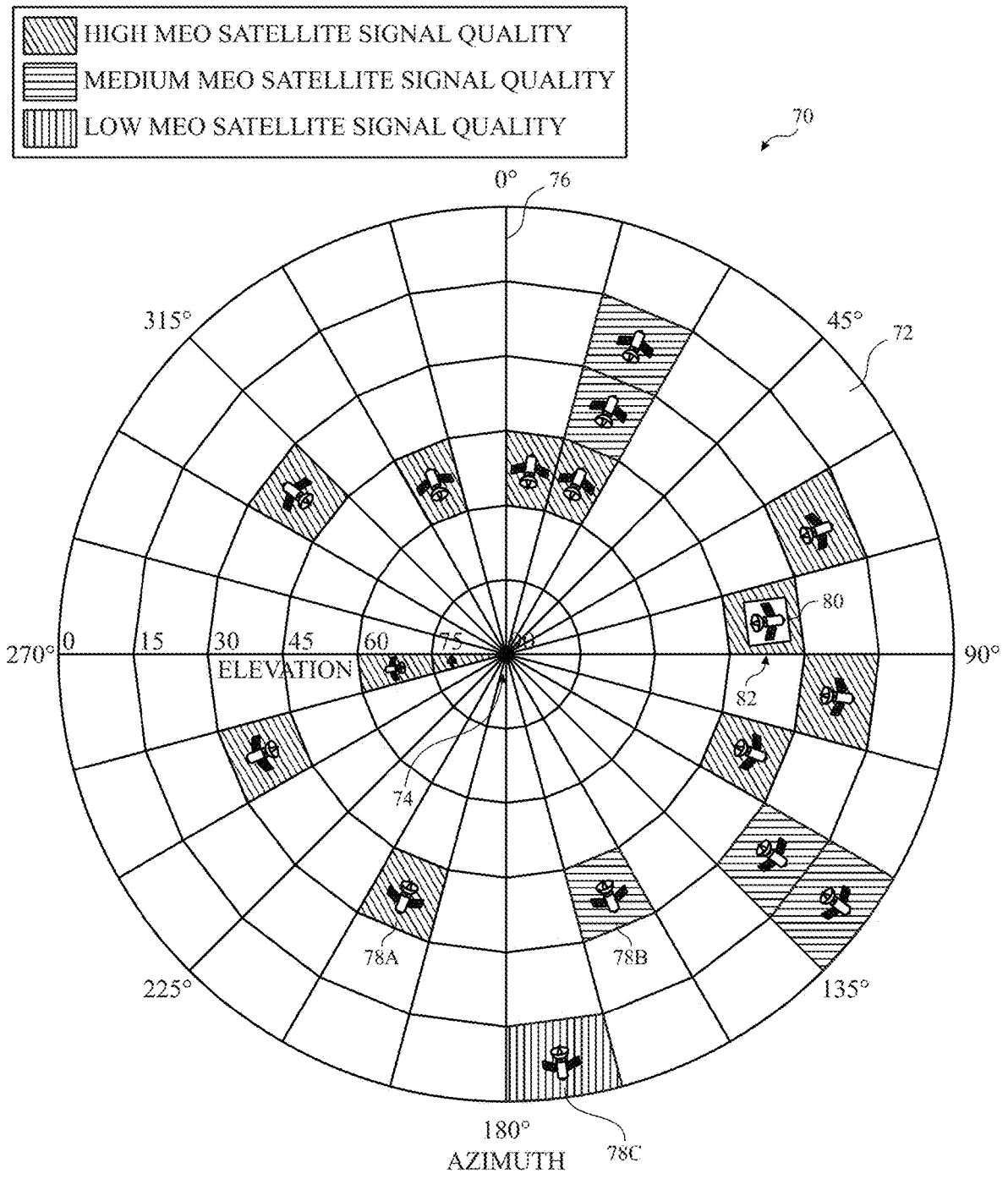
FIG. 5 is an example map that may be displayed by the electronic device of FIG. 1 to indicate signal qualities of MEO satellites and a position of a LEO satellite, according to embodiments of the present disclosure.

FIG. 5 is an example map 70 that may be displayed by the electronic device 10 to indicate signal qualities of MEO satellites 52 and a position of a LEO satellite 50, according to embodiments of the present disclosure. As illustrated, the processor 12 may generate the map 70 using a horizontal coordinate system, such that an azimuth and an elevation or altitude are indicated. In particular, the flat circle of the map 70 may be a horizon 72, and the azimuth is the angle around the horizon 72, with respect to a user positioned at the center 74 of the map 70 and facing 0° (as indicated by vector 76). The azimuth may range from 0° to 360°. The elevation is the angle up from the horizon 72, and provided with respect to the user positioned at the center of the map 70. The elevation may range from 0° to 90°. By providing the azimuth and elevation, the map 70 may indicate the locations of MEO satellites 52 and/or LEO satellites 50 to a user.

In particular, the map 70 displays multiple MEO satellite locations 78 (indicated as 78A-78C). The processor 12 may also visually indicate signal quality of each MEO satellite 52 by color, shading, text, and so on. For example, as illustrated, MEO satellite locations 78A (illustrated as having a first shading pattern) indicate a high MEO satellite signal quality, MEO satellite locations 78B (illustrated as having a second shading pattern) indicate a medium MEO satellite signal quality, and MEO satellite locations 78C (illustrated as having a third shading pattern) indicate a low MEO satellite signal quality. In some embodiments, the illustrated shading may be replaced by different colors. For example, the first shading pattern may be replaced by the color green, the second shading pattern may be replaced by the color blue, and the third shading pattern may be replaced by the color red.

In some embodiments, the processor 12 may determine the signal quality for each MEO satellite 52 based on signal information received from each MEO satellite 52. If the processor 12 determines that the signal quality is within a first (e.g., higher) threshold range (e.g., greater than a threshold value), then the processor 12 may determine that the signal quality is high. If the processor 12 determines the signal quality is within a second (e.g., lower) threshold range (e.g., less than a threshold value), then the processor 12 may determine that the signal quality is low. The processor 12 may also determine whether the signal quality is within additional threshold ranges (e.g., within a third threshold range, fourth threshold range, and so on), and, if so, determine that the signal quality is of a corresponding quality (e.g., medium, medium low, medium high, and so on).

For example, each MEO satellite 52 may be a GNSS satellite, and the processor 12 may receive GNSS signal information from each MEO satellite 52. The processor 12 may determine a signal-to-noise ratio (SNR) for the GNSS signal information received from each MEO satellite 52, and determine the signal quality of each MEO satellite 52 based on its SNR. That is, if the SNR is within a first (e.g., higher) threshold range, then the processor 12 may determine that the signal quality is high. If the processor 12 determines the SNR for the GNSS signal information received from a MEO satellite 52 is within a second (e.g., medium) threshold range, then the processor 12 may determine that the signal quality is medium. If the processor 12 determines the SNR for the GNSS signal information received from a MEO satellite 52 is within a third (e.g., low) threshold range, then the processor 12 may determine that the signal quality is low.

However, SNR may vary between different models of electronic devices, receivers, and/or satellite interfaces. For example, the SNR for the same satellite signal may be dependent upon a receiver's front-end bandwidth, and, as a result, may not provide an accurate measure of MEO satellite signal quality between different devices. Accordingly, to provide a more accurate measure of MEO satellite signal quality, the processor 12 may determine a carrier-to-noise density ($CN_0$) for each MEO satellite 52, and determine the signal quality of each MEO satellite 52 based on its $CN_0$. If the $CN_0$ is within a first (e.g., higher) threshold range, then the processor 12 may determine that the signal quality is high. If the processor 12 determines the $CN_0$ for a MEO satellite 52 is within a second (e.g., medium) threshold range, then the processor 12 may determine that the signal quality is medium. If the processor 12 determines the $CN_0$ for a MEO satellite 52 is within a third (e.g., low) threshold range, then the processor 12 may determine that the signal quality is low.

Additionally or alternatively, GNSS satellite information may include a navigation message having navigation data bits. For example, in the case of GPS, the navigation message may include 30-second frames 1,500 bits long that convey date and time, status of the GNSS MEO satellite 52, an ephemeris (e.g., precise orbital information for the GNSS MEO satellite 52), an almanac (e.g., status and low-resolution orbital information for the GNSS MEO satellites 52 of the GNSS system), and the like. As an additional or alternative technique to provide signal quality that is independent of the model of the electronic device, receiver, and/or satellite interface, the processor 12 may determine the signal quality of each MEO satellite 52 based on whether the processor 12 can decode the navigation data bits (e.g., bits of the navigation message), how many of navigation data bits the processor 12 can decode, and so on. For example, if the processor 12 decodes a first (e.g., higher) threshold range of navigation data bits (e.g., greater than 0 bits, greater than 500 bits, greater than 750 bits, greater than 1000 bits, and so on), then the processor 12 may determine that the signal quality is high. If the processor 12 decodes a second (e.g., medium) threshold range of navigation data bits, then the processor 12 may determine that the signal quality is medium. If the processor 12 decodes a third (e.g., low) threshold range of navigation data bits, then the processor 12 may determine that the signal quality is low.

It should be understood that the processor 12 may use multiple types and/or any other suitable type of GNSS satellite information to determine the signal quality of each MEO satellite 52. For example, the processor 12 may combine the SNR, $CN_0$, and/or the number of successfully decoded navigation bits in any suitable manner to determine the signal quality of each MEO satellite 52. In some embodiments, the processor 12 may use a weighting scale and apply a weight to each type of GNSS satellite information to determine the signal quality of each MEO satellite 52. Additionally or alternatively, the processor 12 may combine determining whether the $CN_0$ is within a threshold range with determining whether the navigation bits have been successfully decoded to determine the signal quality of each MEO satellite 52.

As an example, the processor 12 may use the algorithm shown in Table 1 below to determine the signal quality of each MEO satellite 52 based on the $CN_0$ and the successfully decoded navigation bits of the respective GNSS satellite information. It should be understood that the threshold ranges for the $CN_0$, determinations of whether the navigation data bits are decoded, and the signal quality determinations are listed merely as examples, and different threshold ranges for the $CN_0$, determinations of whether the navigation data bits are decoded, and signal quality determinations are contemplated. Advantageously, the algorithm shown in Table 1 may provide accurate and consistent determinations of MEO satellite signal quality as measuring the $CN_0$ and decoding of navigation data bits may not vary with different models of electronic devices, receivers, and/or satellite interfaces.

TABLE 1

| $CN_0$ | Navigation data bits decoded? | Signal quality |
|---|---|---|
| <18 decibel-Hertz (dB-Hz) | No | Low |
| ≥18 and <25 dB-Hz | Yes | Medium |
| ≥25 dB-Hz | No | Medium |
| ≥25 dB-Hz | Yes | High |

In particular, Table 1 describes an algorithm where the processor 12 may determine the signal quality of a MEO satellite 52 to be low in response to determining that the $CN_0$ of the MEO satellite 52 is within a low threshold range (e.g., less than 18 dB-Hz) and the navigation data bits of the navigation message in the GNSS satellite information corresponding to the MEO satellite 52 cannot be decoded. Additionally, the processor 12 may determine the signal quality of the MEO satellite 52 to be medium in response to determining that the $CN_0$ of the MEO satellite 52 is within a medium threshold range (e.g., greater than or equal to 18 dB-Hz and less than 25 dB-Hz) and the navigation data bits of the navigation message in the GNSS satellite information corresponding to the MEO satellite 52 can be decoded. The processor 12 may also determine the signal quality of the MEO satellite 52 to be medium in response to determining that the $CN_0$ of the MEO satellite 52 is within a high threshold range (e.g., greater than or equal to 25 dB-Hz) and the navigation data bits of the navigation message in the GNSS satellite information corresponding to the MEO satellite 52 cannot be decoded. Finally, the processor 12 may determine the signal quality of the MEO satellite 52 to be high in response to determining that the $CN_0$ of the MEO satellite 52 is within the high threshold range and the navigation data bits of the navigation message in the GNSS satellite information corresponding to the MEO satellite 52 can be decoded.

As should be understood, the higher the signal quality of a MEO satellite 52 near a LEO satellite 50 as displayed on the map 70, the higher the likelihood the processor 12 may be able to establish communication with the LEO satellite 50 via the LEO satellite interface 26. In particular, when the signal quality of the MEO satellite 52 is high, the processor 12 may have a higher likelihood to establish communication with the LEO satellite 50 than when the signal quality of the MEO satellite 52 is medium. When the signal quality of the MEO satellite 52 is medium, the processor 12 may have a higher likelihood to establish communication with the LEO satellite 50 than when the signal quality of the MEO satellite 52 is low. A similar relationship between signal quality of the MEO satellite 52 and the likelihood to establish communication with the LEO satellite 50 in embodiments where there are more or less gradations of signal quality (e.g., highest, high, medium, low, lowest).

The processor 12 may also indicate one or more LEO satellite locations 80 on the map 70. In the illustrated example, the LEO satellite location 80 is indicated using the no shading pattern, though any other suitable indication, such as another shading pattern, color, text, another graphic, another icon, and so on, is contemplated. Indicating a LEO satellite location 80 may guide the user to move the electronic device 10 to ensure a higher likelihood of establishing communication with a LEO satellite 50. In particular, if there is a high signal quality from a MEO satellite 52 at a grid location (e.g., 82), then there is a clear line of sight to that MEO satellite 52. Accordingly, there may also be a clear line of sight to a LEO satellite 50 that provides coverage at that same grid location. Thus, the user may move the electronic device 10 to ensure that a grid location that the LEO satellite 50 is near indicates a high signal quality from a MEO satellite 52.

Figure 6:
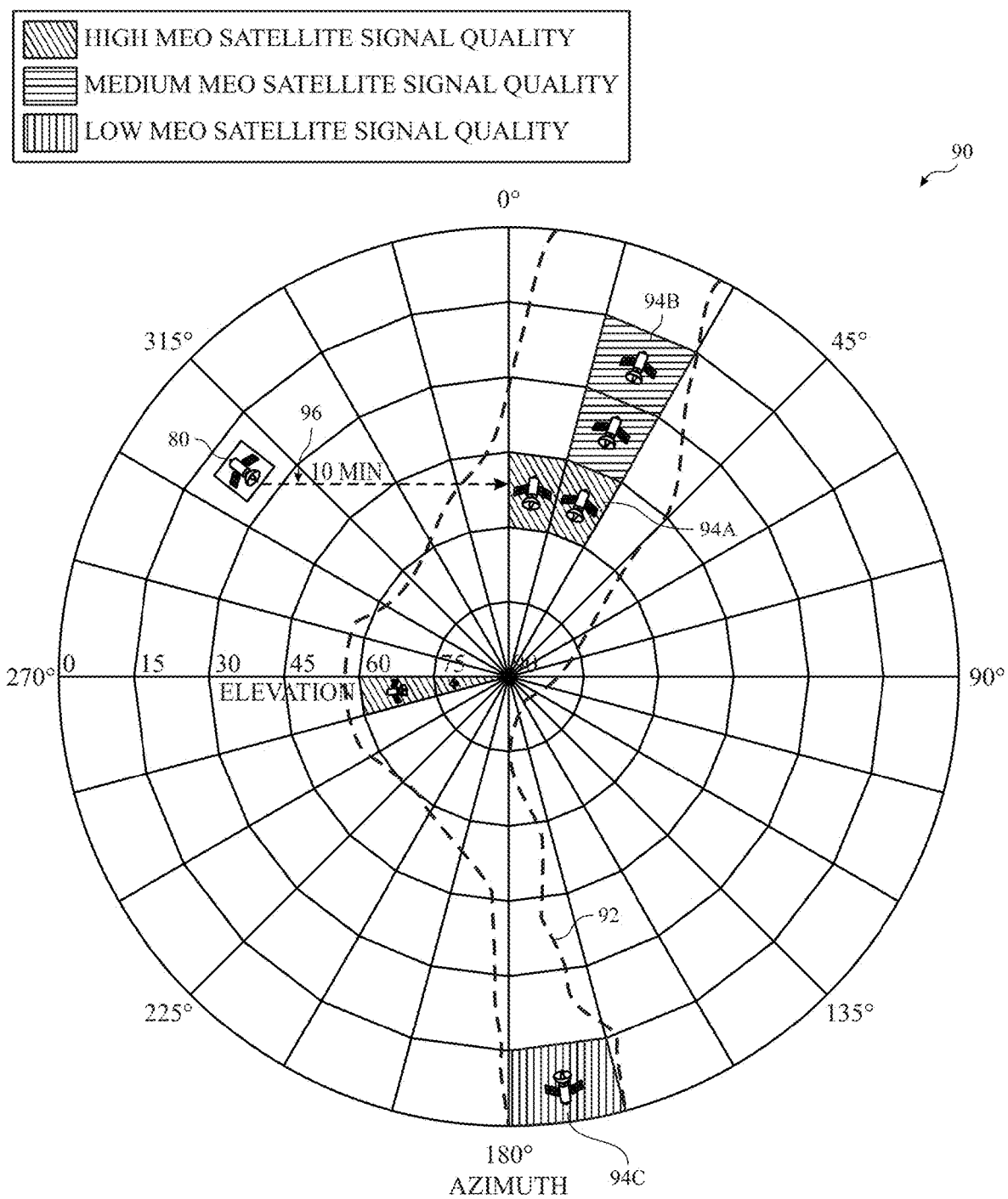
FIG. 6 is an example map that may be displayed by the electronic device of FIG. 1 when the electronic device has a limited view of the sky, according to embodiments of the present disclosure.

As an example, during certain circumstances, the user may have a narrower view of the sky, and thus may not have a clear line of sight to many satellites. FIG. 6 is an example map 90 that may be displayed by the electronic device 10 when the electronic device 10 has a limited view of the sky, according to embodiments of the present disclosure. For example, the user may be at the bottom of a narrow canyon, may be in an alley between two tall buildings, or the like. As such, the number of signal quality indicators for MEO satellite locations 78 on the map 90 may be less than if the electronic device 10 had a wider or fuller view of the sky (e.g., as depicted in FIG. 5). In this example, the dashed lines 92 may represent the limited view from the bottom of a narrow canyon, and, as a result, only those MEO satellites 52 that have a clear line of sight from the bottom of the narrow canyon may be indicated on the map 90 (depicted as 94A-94C). If the electronic device 10 were moved to a wider or fuller view of the sky, then the map 90 may show more MEO satellite location 78 (e.g., as depicted in FIG. 5).

In some embodiments, the processor 12 may display an indication 96 of how the LEO satellite 50 (as indicated by the LEO satellite location 80) is moving, so that the user will be able to increase the likelihood of communication with the LEO satellite 50 by causing a nearby MEO satellite location or locations (e.g., 94A) to indicate a high signal quality. The indication 96 may include any suitable format to convey how the LEO satellite 50 is moving, including arrows, a distance that the LEO satellite 50 will move and corresponding time it takes the LEO satellite 50 to move that distance, a slider or track bar that shows the LEO satellite 50 moving and the corresponding time it takes the LEO satellite 50 to move, displaying the LEO satellite location 80 as a drag-and-drop icon to show the LEO satellite 50 moving and the corresponding time it takes the LEO satellite 50 to move, and so on. As illustrated in FIG. 6, the indication 96 shows a direction that the LEO satellite 50 is moving (via the arrow), and also shows that the LEO satellite 50 will be near the GEO satellite location 94 in ten minutes.

Figure 7:
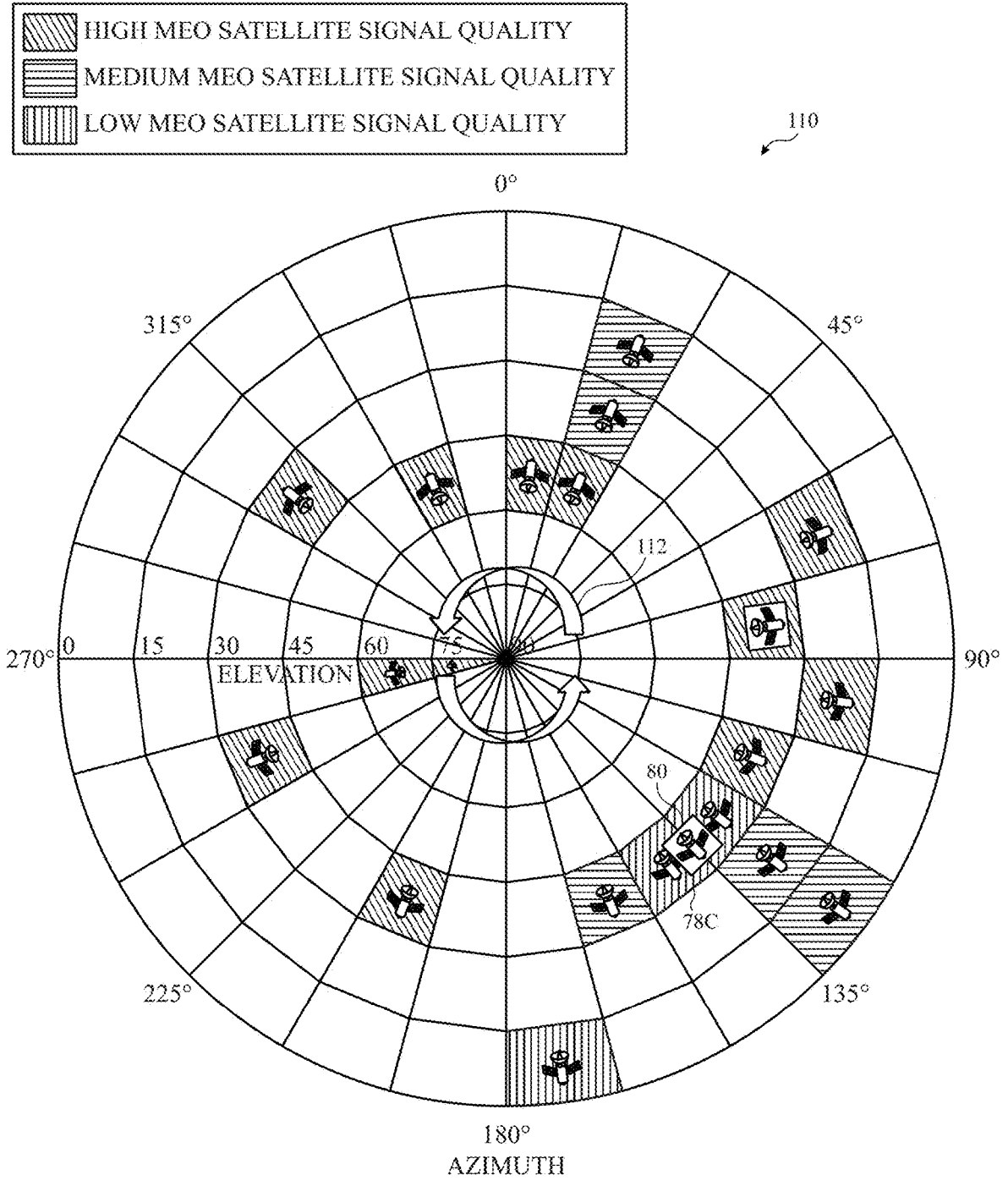
FIG. 7 is an example map that may be displayed by the electronic device of FIG. 1 indicating low global navigation satellite system (GNSS) signal quality near a LEO satellite, according to embodiments of the present disclosure.
Figure 8:
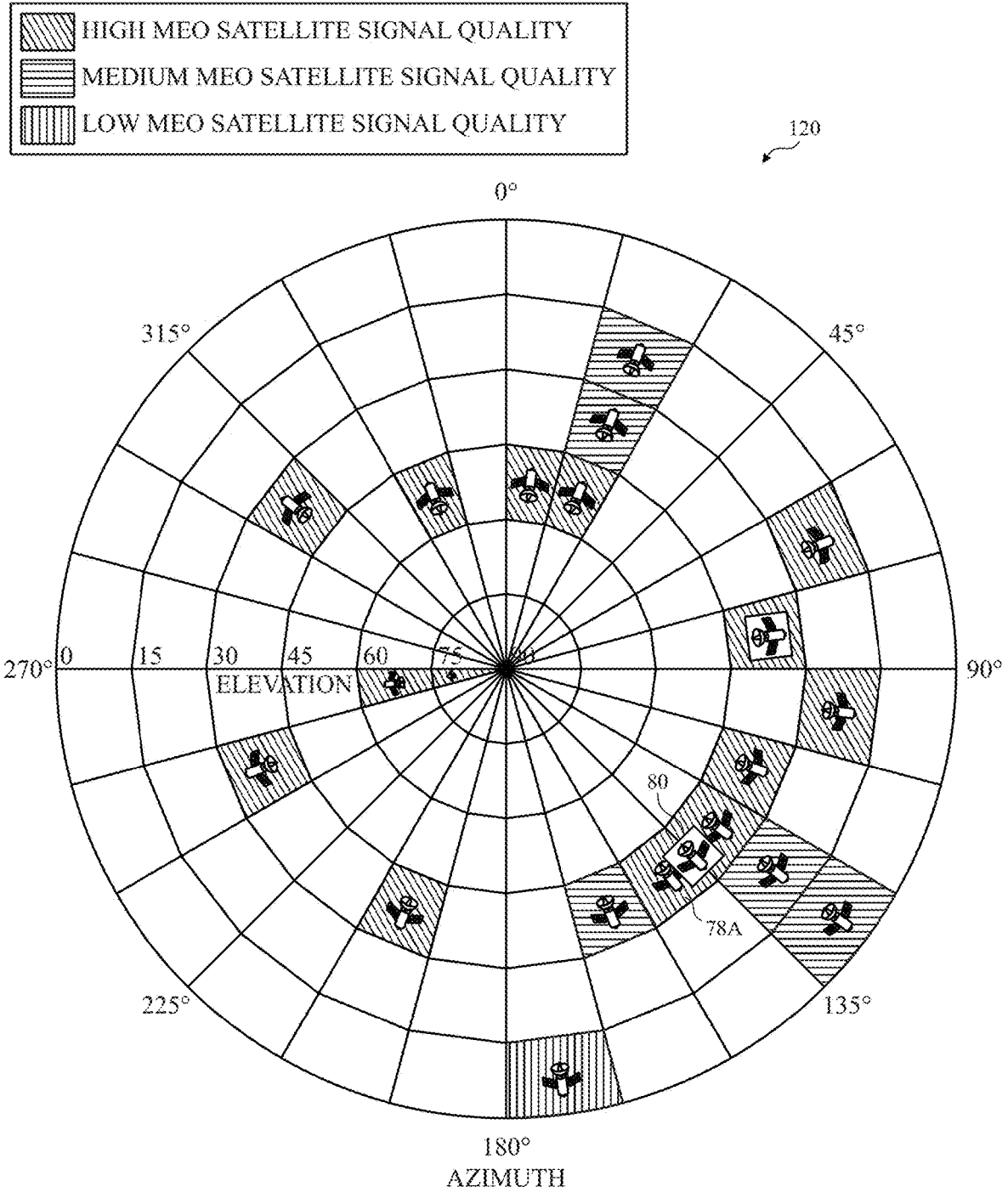
FIG. 8 is an example map that may be displayed by the electronic device of FIG. 1 indicating high GNSS signal quality near the LEO satellite of FIG. 7 after the electronic device has been moved, according to embodiments of the present disclosure.

FIGS. 7 and 8 provide an example of how the map of the MEO satellite locations 78 guide the user to move the electronic device 10 to achieve a greater likelihood of establishing communication with a LEO satellite 50. In particular, FIG. 7 is an example map 110 that may be displayed by the electronic device 10 indicating low GNSS signal quality near a LEO satellite 50, according to embodiments of the present disclosure. As illustrated, the processor 12 displays the LEO satellite location 80 near the GNSS satellite locations 78C with low signal quality (e.g., as indicated by the MEO satellite location 78C shaded in the third shading pattern). Because this may result in a low likelihood of establishing communication with the LEO satellite 50 at the LEO satellite location 80, the processor 12 may indicate that the electronic device 10 should be moved. The processor 12 may provide an indication 112 through any suitable format, such as an audio output (e.g., recorded or synthetic voice prompting a user to move the electronic device 10), haptic output (e.g., vibrating the electronic device 10), a visual output (e.g., displaying text, an image, and/or a video prompting the user to move the electronic device 10), and so on. As illustrated, the indication 112 may include curved arrows that prompt the user to move the electronic device 10 around. In some cases, tilting or moving the electronic device 10 at different angles may enable the GNSS satellite locations 78C to change to indicate better signal quality. In other cases, the user may have to move the electronic device 10 to a different location to acquire better signal quality.

After moving the electronic device 10 (e.g., by tilting or moving to a different location), the GNSS satellite locations 78C may change to indicate better signal quality. FIG. 8 is an example map 120 that may be displayed by the electronic device 10 indicating high GNSS signal quality near the LEO satellite 50 of FIG. 7 after the electronic device 10 has been moved, according to embodiments of the present disclosure. For example, the user may have tilted, angled, or moved the electronic device 10 so that the one or more antennas 44 may have a clear line of sight to the GNSS satellite 52 at the GNSS satellite location 78A. Accordingly, the processor 12 may receive better GNSS signal quality from the GNSS satellite location 78A, as indicated by the MEO satellite location 78A. Thus, the electronic device 10 may have an increased likelihood of establishing communication with the LEO satellite 50 at the LEO satellite location 80, as compared to when the GNSS signal quality is low (as shown in FIG. 7).

In some embodiments, the processor 12 may indicate a direction the electronic device 10 should be moved to increase the GNSS signal quality so that communication with a LEO satellite 50 is more likely to be established. Additionally or alternatively, the processor 12 may overlay or underlay the map with a top or bird's-eye view of structures (e.g., buildings) and/or natural landscape (e.g., trees, cliffs) corresponding to the locations of the map. For example, the processor 12 may overlay or underlay the map with satellite imagery or rendering (e.g., a low resolution rendering) of the locations of the map.

Figure 9:
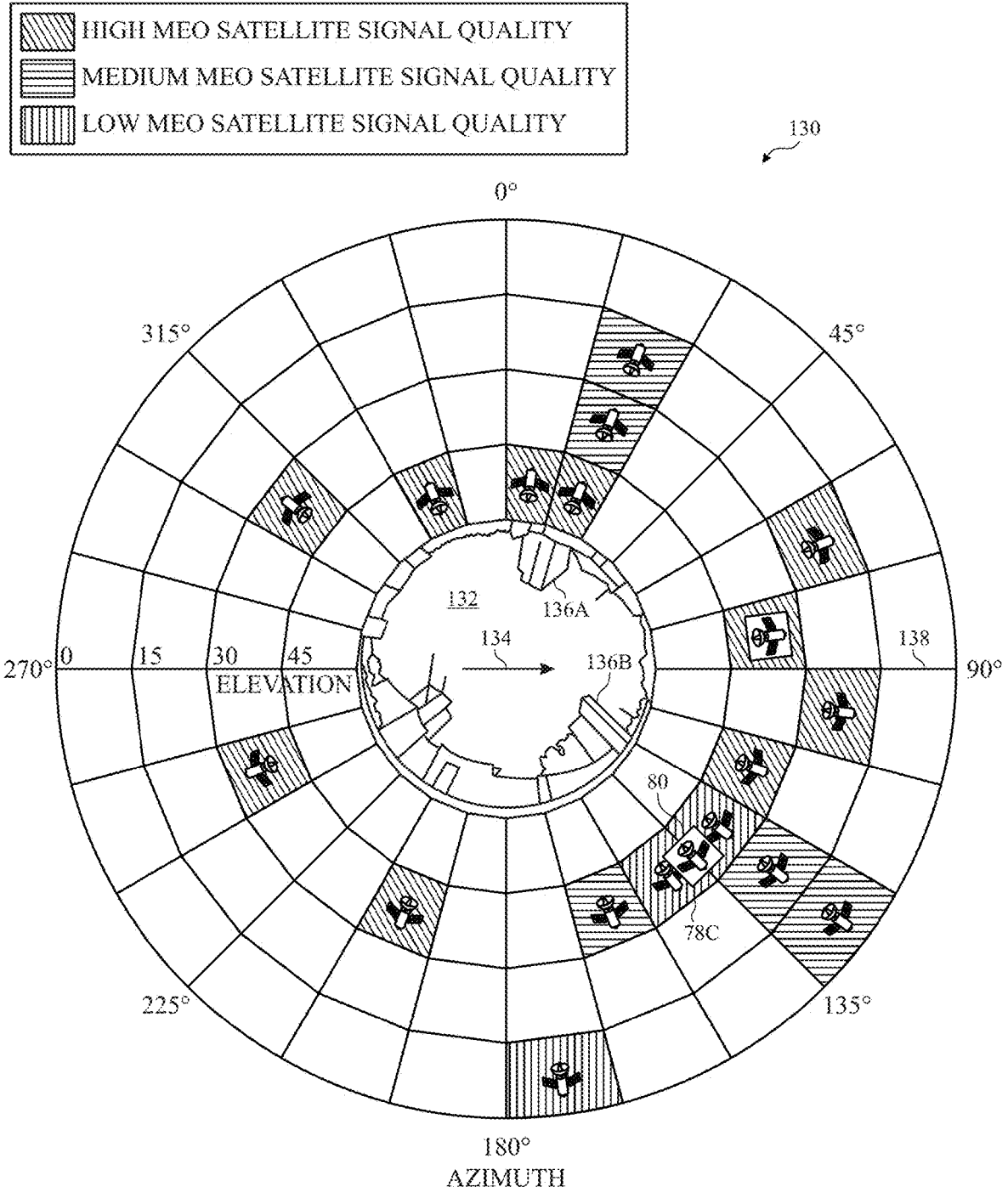
FIG. 9 is an example map that may be displayed by the electronic device of FIG. 1 that includes an underlay of satellite imagery and an indication for moving the electronic device, according to embodiments of the present disclosure.

FIG. 9 is an example map 130 that may be displayed by the electronic device 10 that includes an underlay 132 of satellite imagery and an indication 134 for moving the electronic device 10, according to embodiments of the present disclosure. The underlay 132 shows a number of buildings (e.g., 136A, 136B) at the locations of the map 130. Moreover, the signal quality of the GNSS satellite 52 at the GNSS satellite location 78C (which is nearest the LEO satellite location 80) is low due to the building 136B blocking the line of sight from the electronic device 10 to the GNSS satellite 52. Accordingly, the processor 12 may display the indication 134 to move the electronic device 10 in the 90° azimuth direction 138. In some embodiments, the electronic device 10 may include a motion sensor 42, such as one or more gyroscopes or accelerometers, that detects changes in the motion of the electronic device 10 and/or determines an orientation of the electronic device 10 (e.g., tilt, how the user is holding the electronic device 10). The processor 12 may then display the indication 134 based on the detected motion and/or position of the electronic device 10. For example, because the processor 12 may determine the position of the electronic device 10, the processor 12 may point the illustrated arrow of the indication 134 in the 90° azimuth direction 138 based on how the electronic device 10 is oriented (e.g., in the 90° azimuth direction 138, opposite the 90° azimuth direction 138, at a right angle to the 90° azimuth direction 138, and so on). If the electronic device 10 is moved in the 90° azimuth direction 138 according to the indication 134, such that the building 136 no longer blocks the line of sight from the electronic device 10 to the GNSS satellite 52, then the signal quality of the GNSS satellite 52 at the GNSS satellite location 78C may increase, thus increasing the likelihood of establishing communication with the LEO satellite 50.

Figure 10:
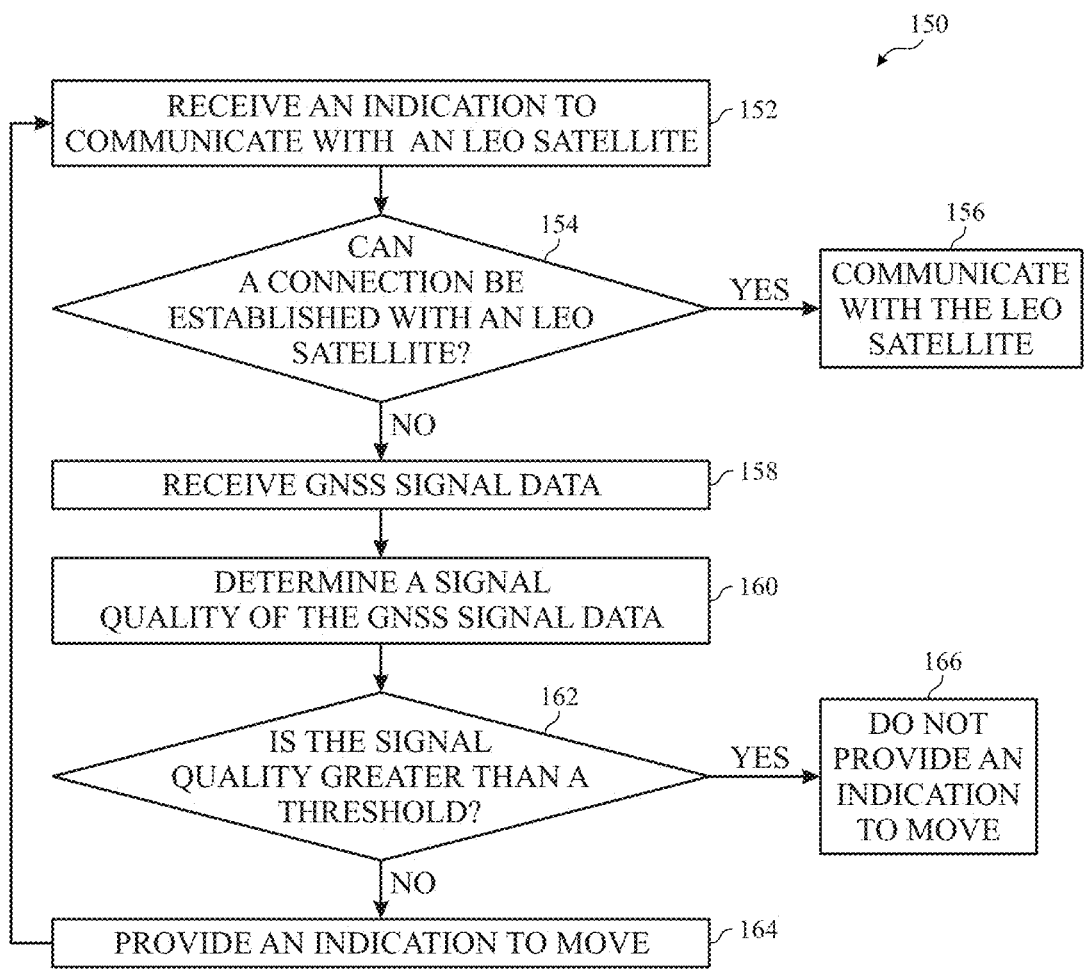
FIG. 10 is a flowchart of a method for determining whether to provide an indication to move the electronic device of FIG. 1, according to embodiments of the present disclosure.

With the foregoing in mind, FIG. 10 is a flowchart of a method 150 for determining whether to provide an indication to move the electronic device 10, according to embodiments of the present disclosure. Any suitable device (e.g., a controller) that may control components of the electronic device 10, such as the processor 12, may perform the method 150. In some embodiments, the method 150 may be implemented by executing instructions stored in a tangible, non-transitory, computer-readable medium, such as the memory 14 or storage 16, using the processor 12. For example, the method 150 may be performed at least in part by one or more software components, such as an operating system of the electronic device 10, one or more software applications of the electronic device 10, and the like. While the method 150 is described using steps in a specific sequence, it should be understood that the present disclosure contemplates that the described steps may be performed in different sequences than the sequence illustrated, and certain described steps may be skipped or not performed altogether.

In process block 152, the processor 12 receives an indication to communicate with a LEO satellite 50. In particular, the LEO satellite interface 26 may attempt to communicate with the LEO satellite 50. In some embodiments, a user may open an application stored in the storage 16 and executed by the processor 12 that attempts to communicate with the LEO satellite 50.

In decision block 154, the processor 12 determines whether communication can be established with the LEO satellite 50. For example, the processor 12 may attempt to connect to the LEO satellite 50 using the LEO satellite interface 26. If communication can be established with the LEO satellite 50, then, in process block 156, the processor 12 communicates with the LEO satellite 50.

The processor 12 may not be able to establish communication with the LEO satellite 50 because one or more antennas 44 of the electronic device 10 may not have a clear line of sight to the LEO satellite 50. That is, natural impediments (e.g., trees or cliffs) and/or manmade impediments (e.g., buildings, bridges, ceilings, or roofs) may block the one or more antennas 44 from the LEO satellite 50. Moreover, because the LEO satellite 50 has a relatively fast orbital speed (about 28,000 km/hour) and has a relatively smaller coverage profile (e.g., when compared to a MEO satellite 52), a window for the processor 12 to establish communication with the LEO satellite 50 may be scarce and/or limited. If communication cannot be established with the LEO satellite 50, then, in process block 158, the processor 12 receives GNSS signal data from one or more MEO satellites 52 (e.g., forming a GNSS network).

In process block 160, the processor 12 determines a signal quality of the GNSS signal data. In particular, the processor 12 may determine a signal-to-noise ratio (SNR) of at least a portion of the GNSS signal data, a carrier-to-noise density ($CN_0$) of at least the portion of the GNSS signal data of the GNSS signal data corresponding to each MEO satellite 52, attempt to decode navigation data bits of at least the portion of the GNSS signal data of the GNSS data signal corresponding to each MEO satellite 52 and/or perform any other suitable type of analysis of at least the portion of the GNSS signal data. The processor 12 may then determine the signal quality of at least the portion of the GNSS signal data based on the SNR, the $CN_0$, the decoded navigation data bits, and/or any other suitable type of analysis of at least the portion of the GNSS signal data. For example, the processor 12 may determine the $CN_0$ for one or more MEO satellites 52 and attempt to decode navigation data bits corresponding to the one or more MEO satellites 52, and determine the signal quality for the one or more MEO satellites 542 using Table 1 above. Advantageously, using the $CN_0$ and/or successful decoding of the navigation data bits may provide an accurate measurement of GNSS signal quality as these factors may be only negligibly affected by variations of electronic device models, receiver models, satellite interface models, and so on.

In decision block 162, the processor 12 determines whether the signal quality of the GNSS signal data is greater than a threshold. The threshold may be any suitable threshold that indicates that the signal quality of the GNSS signal data is sufficient for communication with the LEO satellite 50. For example, in the case where Table 1 is being used, the threshold may be that the MEO satellites 52 on a map (e.g., the map 70 shown in FIG. 5) have at least a medium or high signal quality. Thus, the threshold may take into account multiple factors (e.g., including $CN_0$ and successful decoding of the navigation data bits). In another example, the threshold may be such that at least 25%, 50%, 75%, and so on, of the MEO satellites 52 on a map (e.g., the map 70 shown in FIG. 5) have medium or high signal quality. Thus, the threshold may aggregate the signal qualities of multiple MEO satellites (e.g., based on a percentage of the MEO satellites, analysis of the signal qualities-such as determining an average, median, minimum, maximum, and so on of the signal qualities). In other examples, the threshold may be such that the average $CN_0$ of the MEO satellites 52 on a map is greater than 18 dB-Hz, 20 dB-Hz, 22 dB-Hz, and so on. In yet another example, the threshold may be such that the average SNR of the MEO satellites 52 on a map is greater than 20 decibels (dB), 50 dB, 80 dB, and so on.

In some embodiments, the processor 12 may determine whether the signal quality of the GNSS signal data corresponding to one or more of the closest MEO satellite 52 to a LEO satellite 50 and/or the one or more of closest MEO satellites 52 to a path of the LEO satellite 50 is greater than the threshold. For example, in FIG. 5, the processor 12 may determine whether the signal quality of the MEO satellite 52 at the grid location 82 is greater than the threshold, as the MEO satellite 52 may simulate the line of sight conditions of the LEO satellite 50 since the MEO satellite 52 and the LEO satellite 50 are located at approximately the same grid location 82. As another example, in FIG. 6, the processor 12 may determine whether the signal quality of the MEO satellite 52 at the MEO satellite 52 at the location 94A is greater than the threshold, as the MEO satellite 52 at the location 94A may simulate the line of sight conditions of the LEO satellite 50 in ten minutes (e.g., when the MEO satellite 52 and the LEO satellite 50 are located at approximately the same location).

If the processor 12 determines that the signal quality of the GNSS signal data is not greater than the threshold, then, in process block 164, the processor 12 provides an indication to move. Otherwise, in process block 166, the processor 12 does not provide an indication to move, as the greater signal quality of the GNSS signal data indicates that the electronic device 10 has an increased likelihood of establishing communication with the LEO satellite 50. In this manner, the method 150 determines whether to provide an indication to move the electronic device 10 to increase the likelihood of establishing communication with the LEO satellite 50. In some embodiments, the indication may be an express indication to move the electronic device 10 in the form of such as an audio output (e.g., recorded or synthetic voice prompting a user to move the electronic device 10), haptic output (e.g., vibrating the electronic device 10), a visual output (e.g., displaying text, an image, and/or a video prompting the user to move the electronic device 10), and so on. For example, the indication may include one or more arrows, such as the indication 112 as shown in FIG. 7 or the indication 134 shown in FIG. 9.

Figure 11:
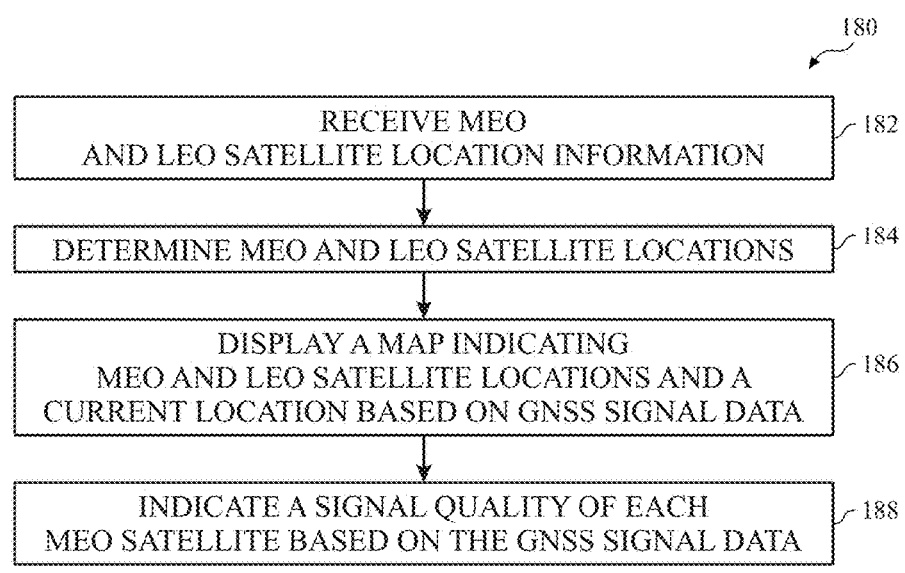
FIG. 11 is a flowchart of a method for providing an indication to move the electronic device of FIG. 1, according to embodiments of the present disclosure.

In additional or alternative embodiments, the indication may indicate that one or more MEO satellites 52 have low signal quality (e.g., the MEO satellite locations 78C illustrated as having the third shading pattern as shown in FIG. 5), thus urging the user to move the electronic device 10 to change the signal quality of those MEO satellite locations 78C. FIG. 11 is a flowchart of a method 180 for providing such an indication to move the electronic device 10, according to embodiments of the present disclosure. Any suitable device (e.g., a controller) that may control components of the electronic device 10, such as the processor 12, may perform the method 180. In some embodiments, the method 180 may be implemented by executing instructions stored in a tangible, non-transitory, computer-readable medium, such as the memory 14 or storage 16, using the processor 12. For example, the method 180 may be performed at least in part by one or more software components, such as an operating system of the electronic device 10, one or more software applications of the electronic device 10, and the like. While the method 180 is described using steps in a specific sequence, it should be understood that the present disclosure contemplates that the described steps may be performed in different sequences than the sequence illustrated, and certain described steps may be skipped or not performed altogether. In some embodiments, the method 180 may be performed as part of the process block 164 of FIG. 10.

In process block 182, the processor 12 receives MEO and LEO satellite location information. In particular, MEO and LEO satellite locations may be known or predetermined, as the entities operating the MEO satellites 52 and the LEO satellites 50 may register the flight paths of the satellites and/or the flight paths of the satellites may be predicted or determined. In some embodiments, the processor 12 may have downloaded the flight paths of the MEO satellites 52 and the LEO satellites 50 (e.g., as part of installation or upkeep of a satellite connection software application, as part of installation or upkeep of a GNSS software application, and the like).

In process block 184, the processor 12 determines the MEO and LEO satellite locations based on the MEO and LEO satellite location information. In process block 186, the processor 12 displays a map indicating the MEO and LEO satellite locations and a current location based on GNSS signal data. In particular, the processor 12 may display a map, such as the map 70 of FIG. 5, on a display 18 of the electronic device 10. Moreover, the processor 12 may use the GNSS signal data received from one or more MEO satellites 52 (e.g., from process block 158 of FIG. 10) to determine the current location of the electronic device 10 (e.g., using satellite location techniques).

In process block 188, the processor 12 indicates a signal quality of each MEO satellite 52 based on the GNSS signal data. In particular, the processor 12 may determine the signal quality of each MEO satellite 52 in the process block 160 of FIG. 10. The processor 12 may then indicate the determined signal quality of each MEO satellite 52 on the displayed map. For example, the processor 12 may indicate the determined signal quality of each MEO satellite 52 as illustrated on the map 70 of FIG. 5, where MEO satellite locations 78A (illustrated as having a first shading pattern) indicate a high MEO satellite signal quality, MEO satellite locations 78B (illustrated as having a second shading pattern) indicate a medium MEO satellite signal quality, and MEO satellite locations 78C (illustrated as having a third shading pattern) indicate a low MEO satellite signal quality. It should be understood that other indications of signal quality are contemplated (e.g., by alternative shading, colors, text, bars, flashing lights, audio cues, or any other suitable techniques). In this manner, the method 180 provides an indication to move the electronic device 10 to increase the likelihood of establishing communication with the LEO satellite 50.

Figure 12:
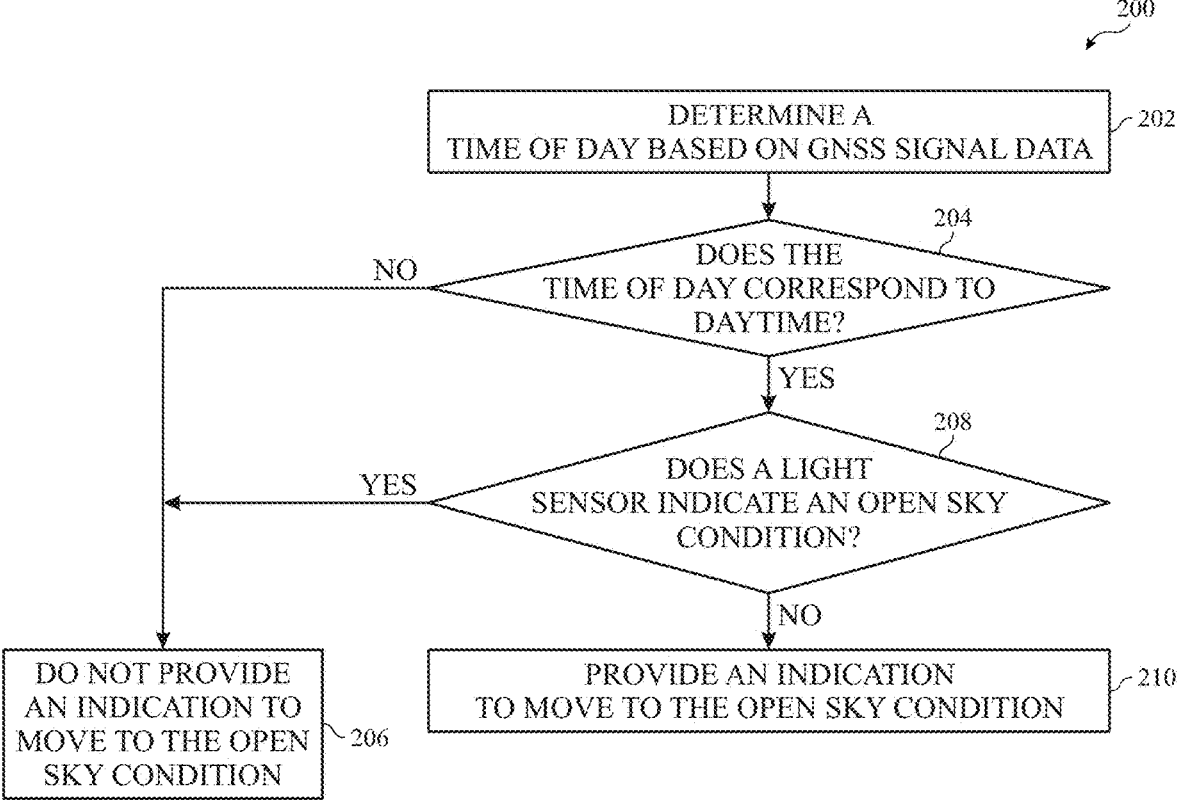
FIG. 12 is a flowchart of a method for providing an indication to move the electronic device of FIG. 1 to an open sky condition, according to embodiments of the present disclosure.

In some embodiments, the electronic device 10 may include a light sensor 40, such as a camera, that detects or measures an amount of ambient light near the electronic device 10. FIG. 12 is a flowchart of a method 200 for providing an indication to move the electronic device 10 to an open sky condition, according to embodiments of the present disclosure. Any suitable device (e.g., a controller) that may control components of the electronic device 10, such as the processor 12, may perform the method 200. In some embodiments, the method 200 may be implemented by executing instructions stored in a tangible, non-transitory, computer-readable medium, such as the memory 14 or storage 16, using the processor 12. For example, the method 200 may be performed at least in part by one or more software components, such as an operating system of the electronic device 10, one or more software applications of the electronic device 10, and the like. While the method 200 is described using steps in a specific sequence, it should be understood that the present disclosure contemplates that the described steps may be performed in different sequences than the sequence illustrated, and certain described steps may be skipped or not performed altogether. In some embodiments, the method 200 may be performed as part of the process block 164 of FIG. 12.

In process block 202, the processor 12 determines a time of day based on GNSS signal data. For example, the processor 12 may use the GNSS signal data received from one or more MEO satellites 52 (e.g., from process block 158 of FIG. 10) to determine the time of day. Indeed, the GNSS signal data may include a navigation message that conveys date and time.

In decision block 204, the processor 12 determines whether the time of day corresponds to daytime. In particular, the processor 12 may determine whether the time of day is one during which the sun is up (e.g., between dawn and dusk). In some embodiments, the processor 12 may also determine a time zone, a current local weather condition, and/or a geographical location of the electronic device 10, and determine whether sunlight may be detectable by the light sensor 40 (as the time, cloudiness or precipitation, and the location of the electronic device 10 may affect whether sunlight may be detectable by the light sensor 40).

If the processor 12 determines that the time of day does not correspond to daytime, then the amount of light detectable by the light sensor 40 may not be indicative of an open sky condition, and, in process block 206, the processor 12 does not provide an indication to move the electronic device 10 to the open sky condition. If the processor 12 determines that the time of day corresponds to daytime, then, in decision block 208, the processor 12 determines whether the light sensor 40 indicates an open sky condition. In particular, the light sensor 40 may detect a brightness of one or more ambient conditions (e.g., light) around or surrounding the electronic device 10. The processor 12 may receive the brightness as an illuminance value, and compare the illuminance value to a threshold. The threshold may be any suitable threshold that indicates daylight, such as greater than or equal to 1 lux, 2 lux, 5 lux, 10 lux, 40 lux, 50 lux, 100 lux, and so on. If the illuminance value is greater than or equal to the threshold, the processor 12 may determine that the light sensor 40 indicates an open sky condition. Otherwise, the processor 12 may determine that the light sensor 40 does not indicate the open sky condition.

If the processor 12 determines that the light sensor 40 indicates the open sky condition, then the electronic device 10 is already in a good condition (in terms of open sky) for establishing communication with the LEO satellite 50, and, in process block 206, the processor 12 does not provide an indication to move the electronic device 10 to the open sky condition. Otherwise, if the processor 12 determines that the light sensor 40 does not indicate the open sky condition, then, in process block 210, the processor 12 provides an indication to move the electronic device 10 to the open sky condition. The indication may be in any suitable format, such as an audio output (e.g., recorded or synthetic voice prompting a user to move the electronic device 10 to the open sky condition), haptic output (e.g., vibrating the electronic device 10), a visual output (e.g., displaying text, an image, and/or a video prompting the user to move the electronic device 10 to the open sky condition), and so on. In this manner, the method 200 may provide an indication to move the electronic device 10 to an open sky condition, thus increasing the likelihood of establishing communication with the LEO satellite 50.

As discussed above with respect to FIG. 5, the processor 12 may display the map 70 with MEO satellite locations 78, where each MEO satellite location 78 is shaded (or otherwise indicated, by coloring, different icons, graphical differences, and so on) to indicate high MEO satellite signal quality (e.g., using the first shading pattern as shown in 78A), medium MEO satellite signal quality (e.g., using the second shading pattern as shown in 78B), and low MEO satellite signal quality (e.g., using the third shading pattern as shown in 78C). In some embodiments, the map 70 may include a neutral (e.g., gray, white, and so on) background, to distinguish from colored signal quality indications. In additional or alternative embodiments, the processor 12 may indicate the likelihood of establishing communication with the LEO satellite 50 using the background. This likelihood may be based on the overall signal quality of the MEO satellites 52, an average signal quality of the MEO satellites 52, one or more signal qualities of one or more MEO satellites 52 nearest the LEO satellite 50 (e.g., the MEO satellite 52 at the grid location 82 and the LEO satellite 50 as shown in FIG. 5), one or more signal qualities of one or more MEO satellites 52 nearest the path of LEO satellite 50 (e.g., the MEO satellite 52 at the location 94A and the LEO satellite 50 as shown in FIG. 6), and so on.

Figure 13:
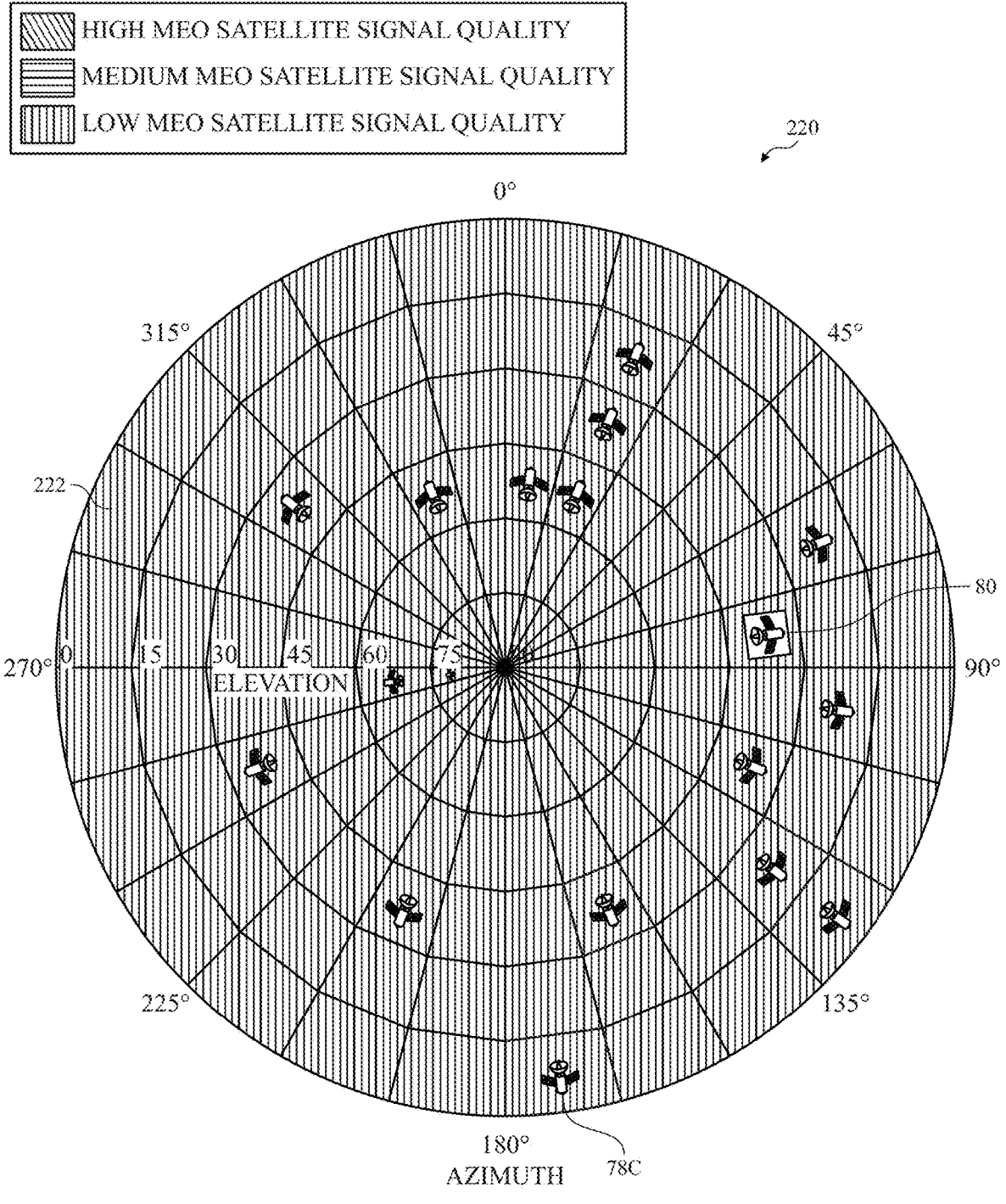
FIG. 13 is an example map that may be displayed by the electronic device of FIG. 1 having a background indicating a low likelihood of establishing communication with a LEO satellite, according to embodiments of the present disclo-sure.

FIG. 13 is an example map 220 that may be displayed by the electronic device 10 having a background 222 indicating a low likelihood of establishing communication with the LEO satellite 50, according to embodiments of the present disclosure. In particular, the MEO satellites 52 shown in the map 220 have low signal quality, as indicated by the MEO satellite indications 78C illustrated as having the third shading pattern. Accordingly, the background 222 is shaded in the third shading pattern, indicating the low likelihood of establishing communication with the LEO satellite 50 due to the poor MEO satellite signal quality.

Figure 14:
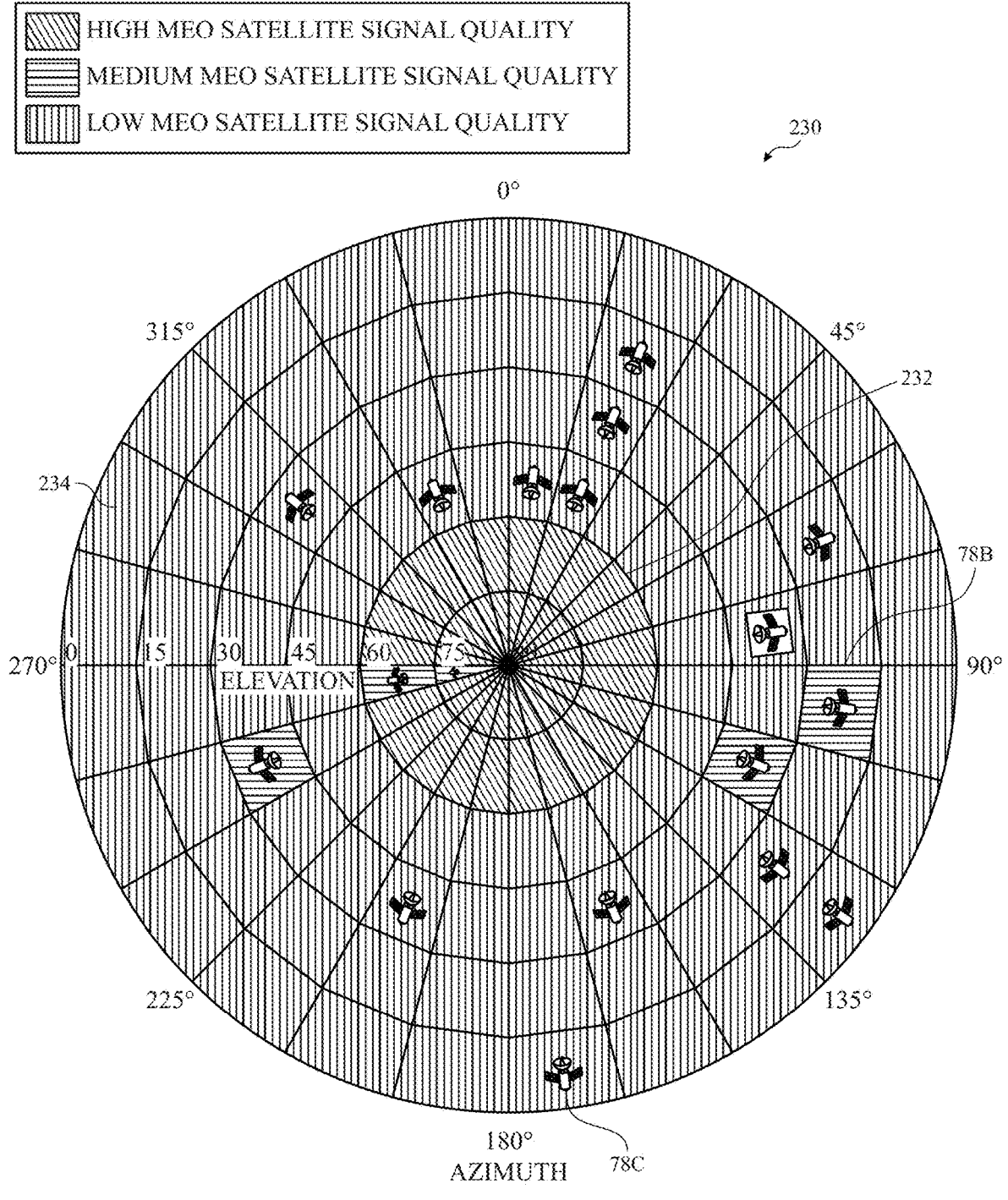
FIG. 14 is an example map that may be displayed by the electronic device of FIG. 1 having a background indicating a medium likelihood of establishing communication with a LEO satellite, according to embodiments of the present disclosure.

FIG. 14 is an example map 230 that may be displayed by the electronic device 10 having a background indicating a medium likelihood of establishing communication with the LEO satellite 50, according to embodiments of the present disclosure. In particular, the MEO satellites 52 shown in the map 220 have a mixture of low and medium signal qualities, as indicated by the MEO satellite indications 78B, 78C illustrated as having the second and third shading patterns, respectively. Accordingly, the background is shaded partially in the first shading pattern and partially in the third shading pattern. In particular, an inner portion 232 of the background is shaded in the first shading pattern, while an outer portion 234 is shaded in the third shading pattern, indicating the medium likelihood of establishing communication with the LEO satellite 50 due to the overall medium MEO satellite signal quality. In additional or alternative embodiments, the background may be shaded in one single shading pattern (e.g., the second shading pattern to indicate medium signal quality). Additionally or alternatively, in some embodiments, the processor 12 may determine that the overall signal quality is low, either due to the number of low MEO satellite signal qualities 78C, due to the MEO satellite location 78C nearest the LEO satellite 50 being of low signal quality, and so on.

Figure 15:
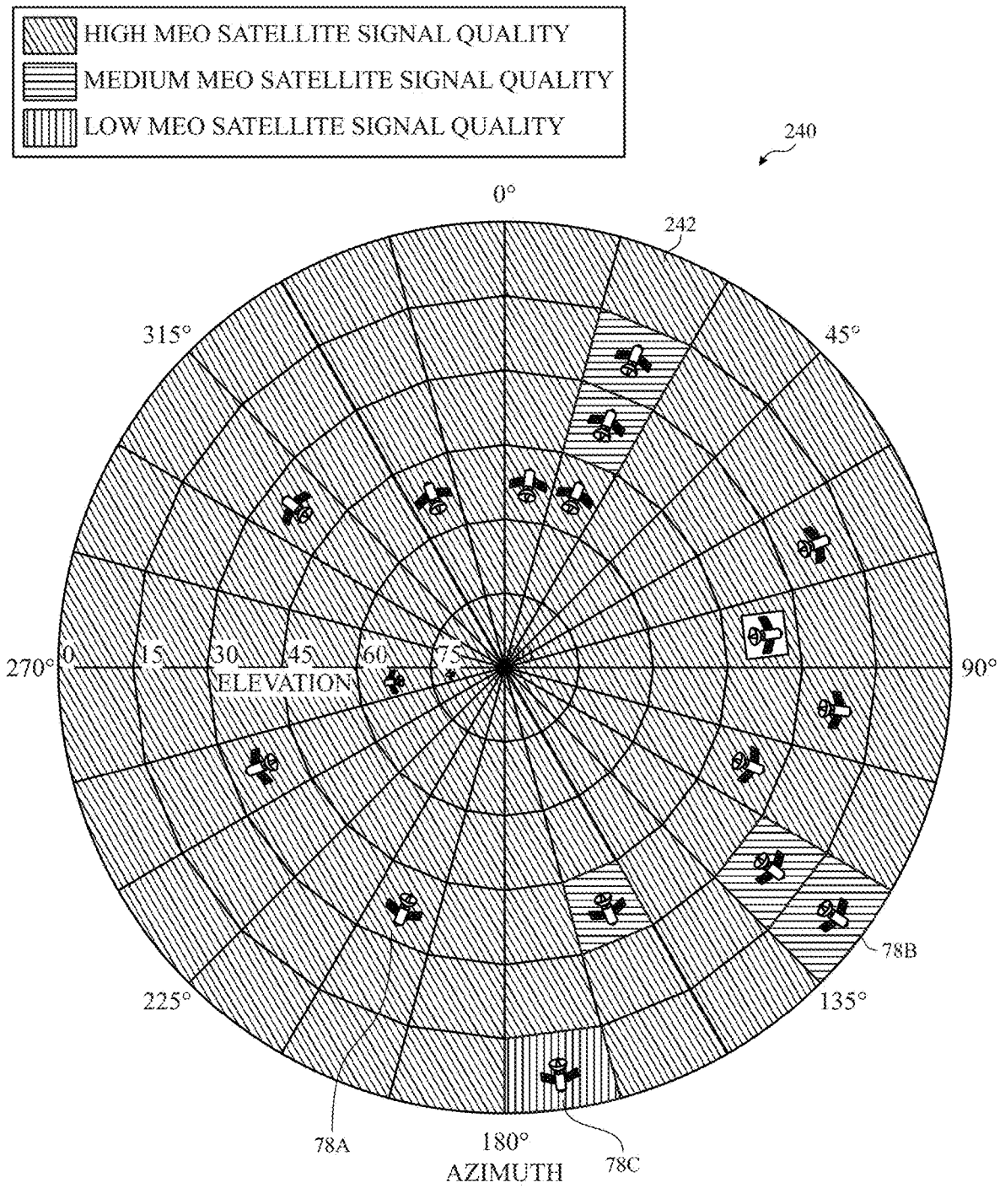
FIG. 15 is an example map that may be displayed by the electronic device of FIG. 1 having a background indicating a high likelihood of establishing communication with a LEO satellite, according to embodiments of the present disclosure.

FIG. 15 is an example map 240 that may be displayed by the electronic device 10 having a background 242 indicating a high likelihood of establishing communication with the LEO satellite 50, according to embodiments of the present disclosure. In particular, the majority of MEO satellites 52 shown in the map 220 have high or medium signal quality, as indicated by the MEO satellite indications 78A, 78B illustrated as having the first and second shading patterns, respectively. Accordingly, the background 242 is illustrated as having the first shading pattern, indicating the high likelihood of establishing communication with the LEO satellite 50 due to the overall high MEO satellite signal quality. Additionally or alternatively, in some embodiments, the processor 12 may determine that the overall signal quality is high due to the MEO satellite location 78A nearest the LEO satellite 50 being of high signal quality. In one embodiment, the processor 12 may determine that the overall signal quality is medium due to the number of medium and low MEO satellite signal qualities 78B, 78C.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An electronic device comprising:
a satellite communication interface; and
one or more processors configured to:
receive a first indication that a connection cannot be established with a low Earth orbit (LEO) satellite orbiting;
receive a signal quality of a global navigation satellite via the satellite communication interface, the global navigation satellite being different than the LEO satellite; and
provide a second indication to move to increase a likelihood of establishing the connection to the LEO satellite based on comparing the signal quality of the global navigation satellite to a threshold.

2. The electronic device of claim 1, wherein the one or more processors are configured to provide the second indication based on the signal quality of the global navigation satellite a not exceeding the threshold.

3. The electronic device of claim 2, comprising a motion sensor configured to determine an orientation of the electronic device, wherein the one or more processors are configured to determine a direction to move the electronic device based on the orientation of the electronic device, the second indication comprising prompting movement in the direction.

4. The electronic device of claim 1, wherein the one or more processors are configured to receive additional signal quality of the global navigation satellite via an additional satellite communication interface of an additional electronic device communicatively coupled to the electronic device.

5. The electronic device of claim 1, comprising a light sensor configured to determine a brightness of ambient light near the electronic device.

6. The electronic device of claim 5, wherein the one or more processors are configured to provide a third indication to move based on a time of day corresponding to daylight and the brightness of the ambient light not exceeding an additional threshold.

7. A method comprising:
determining, via an electronic device, that a connection to a low Earth orbit (LEO) satellite cannot be established;
receiving, via the electronic device, a first indication of signal quality of one or more global navigation satellites different from the LEO satellite;
providing, via the electronic device, a second indication to move to increase a likelihood of establishing the connection to the LEO satellite based on comparing, as performed by the electronic device, the signal quality of the one or more global navigation satellites to a threshold.

8. The method of claim 7, wherein providing the second indication to move to increase the likelihood of establishing the connection to the LEO satellite comprises displaying, via a user interface of the electronic device, a map indicating one or more locations of the one or more global navigation satellites and a location of the LEO satellite.

9. The method of claim 8, wherein providing the second indication to move the electronic device to increase the likelihood of establishing the connection to the LEO satellite comprises:
determining, via the electronic device, a respective signal quality of each global navigation satellite of the one or more global navigation satellites; and
indicating, via the electronic device, the respective signal quality of each global navigation satellite on the map.

10. The method of claim 9, wherein determining the respective signal quality of each global navigation satellite comprises determining a respective carrier-to-noise density (CN$_0$) for each global navigation satellite.

11. The method of claim 9, wherein determining the respective signal quality of each global navigation satellite comprises determining whether a plurality of navigation data bits for each global navigation satellite can be decoded.

12. The method of claim 7, comprising:
  determining, via the electronic device, a time of day based on signal data received from the one or more global navigation satellites; and
  receiving, via a light sensor of the electronic device, a brightness of ambient light near the electronic device.

13. The method of claim 12, comprising providing, via the electronic device, a third indication to move based on the time of day corresponding to daylight and the brightness of the ambient light not exceeding a threshold.

14. The method of claim 7, comprising:
  receiving, via the electronic device, information associated with a path of the LEO satellite; and
  displaying, via a user interface of the electronic device, the path of the LEO satellite.

15. The method of claim 14, comprising displaying, via the user interface, a first predicted signal quality of the LEO satellite based on the signal quality of the one or more global navigation satellites and the path of the LEO satellite.

16. A non-transitory computer-readable media, comprising computer-readable instructions that, when executed by one or more processors, cause the one or more processors to:
  receive signal data of a first medium Earth orbit (MEO) satellite and of a second MEO satellite;
  provide a first visual indication of a first signal quality of the first MEO satellite at a first location based on the signal data;
  provide a second visual indication of a second signal quality of the second MEO satellite at a second location based on the signal data;
  provide a third visual indication of a low Earth orbit (LEO) satellite;
  receive information associated with a path of the LEO satellite and indicate the path of the LEO satellite;

indicate a first predicted signal quality of the LEO satellite at the first location based on the first signal quality and the first location being in the path of the LEO satellite; and indicate a second predicted signal quality of the LEO satellite at the second location based on the second signal quality and the second location being in the path of the LEO satellite.

17. The non-transitory computer-readable media of claim 16, wherein the computer-readable instructions cause the one or more processors to indicate a distance of the path of the LEO satellite.

18. The non-transitory computer-readable media of claim 16, wherein the computer-readable instructions cause the one or more processors to determine the first signal quality is low in response to determining that a carrier-to-noise density (CN$_0$) of the first MEO satellite is within a low threshold range and one or more navigation data bits of the signal data associated with the first MEO satellite cannot be decoded.

19. The non-transitory computer-readable media of claim 16, wherein the computer-readable instructions cause the one or more processors to determine the first signal quality is medium in response to determining that a carrier-to-noise density (CN$_0$) of the first MEO satellite is within a middle threshold range and one or more navigation data bits of the signal data associated with the first MEO satellite can be decoded, or in response to determining that the CN$_0$ of the first MEO satellite is within a high threshold range and the one or more navigation data bits of the signal data associated with the first MEO satellite cannot be decoded.

20. The non-transitory computer-readable media of claim 16, wherein the computer-readable instructions cause the one or more processors to determine the first signal quality is high in response to determining that a carrier-to-noise density (CN$_0$) of the first MEO satellite is within a high threshold range and one or more navigation data bits of the signal data associated with the first MEO satellite can be decoded.

* * * * *